US 010859795B2

(12) United States Patent
Chen et al.

(10) Patent No.: US 10,859,795 B2
(45) Date of Patent: Dec. 8, 2020

(54) LENS ASSEMBLY

(71) Applicants: Sintai Optical (Shenzhen) Co., Ltd., ShenZhen (CN); Asia Optical Co., Inc., Taichung (TW)

(72) Inventors: Po-Yu Chen, Taichung (TW); Yuan-Chen Chen, Taichung (TW)

(73) Assignees: SINAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 112 days.

(21) Appl. No.: 16/118,507

(22) Filed: Aug. 31, 2018

(65) Prior Publication Data

US 2019/0086646 A1 Mar. 21, 2019

(30) Foreign Application Priority Data

Sep. 15, 2017 (CN) .......................... 2017 1 0835470

(51) Int. Cl.
  *G02B 9/62* (2006.01)
  *G02B 13/00* (2006.01)
  *G02B 13/04* (2006.01)
  *G02B 13/18* (2006.01)

(52) U.S. Cl.
  CPC ............. *G02B 9/62* (2013.01); *G02B 13/006* (2013.01); *G02B 13/04* (2013.01); *G02B 13/18* (2013.01)

(58) Field of Classification Search
  CPC .......... G02B 13/02; G02B 13/04; G02B 9/62; G02B 13/0045; G02B 13/005; G02B 13/006; G02B 13/18; G02B 9/60; G02B 9/64

USPC .................................................. 359/754–758
See application file for complete search history.

(56) References Cited

U.S. PATENT DOCUMENTS

| 4,394,071 | A | * | 7/1983 | Yamada | G02B 15/02 359/675 |
| 4,634,235 | A | * | 1/1987 | Fujioka | G02B 15/10 359/675 |
| 2012/0056976 | A1 | * | 3/2012 | Lee | G02B 15/177 348/36 |
| 2014/0029115 | A1 | * | 1/2014 | Liao | G02B 13/06 359/713 |

(Continued)

FOREIGN PATENT DOCUMENTS

| CN | 205157867 U | 4/2016 |
| CN | 106680970 U | 5/2017 |

*Primary Examiner* — Jordan M Schwartz
(74) *Attorney, Agent, or Firm* — McClure, Qualey & Rodack, LLP

(57) ABSTRACT

A lens assembly comprises sequentially from an object side to an image side along an optical axis a first lens, a second lens, a third lens, a stop, a fourth lens, a fifth lens and a sixth lens. The first lens is a meniscus with refractive power and includes a convex surface facing an object side and a concave surface facing an image side. The second lens is with negative refractive power and includes a concave surface facing the object side. The third lens is with positive refractive power and includes a convex surface facing the image side. The fourth lens is with positive refractive power and includes a convex surface facing the image side. The fifth lens is a biconcave lens with negative refractive power. The sixth lens is with positive refractive power and includes a convex surface facing the object side.

19 Claims, 24 Drawing Sheets

(56) References Cited

U.S. PATENT DOCUMENTS

| | | | |
|---|---|---|---|
| 2014/0204477 A1* | 7/2014 | Asami | G02B 13/06 |
| | | | 359/738 |
| 2017/0102526 A1* | 4/2017 | Chen | G02B 9/62 |
| 2018/0074289 A1* | 3/2018 | Ichikawa | G02B 13/18 |
| 2018/0341085 A1* | 11/2018 | Bone | G02B 13/0045 |
| 2019/0187442 A1* | 6/2019 | Jia | G02B 13/04 |

* cited by examiner

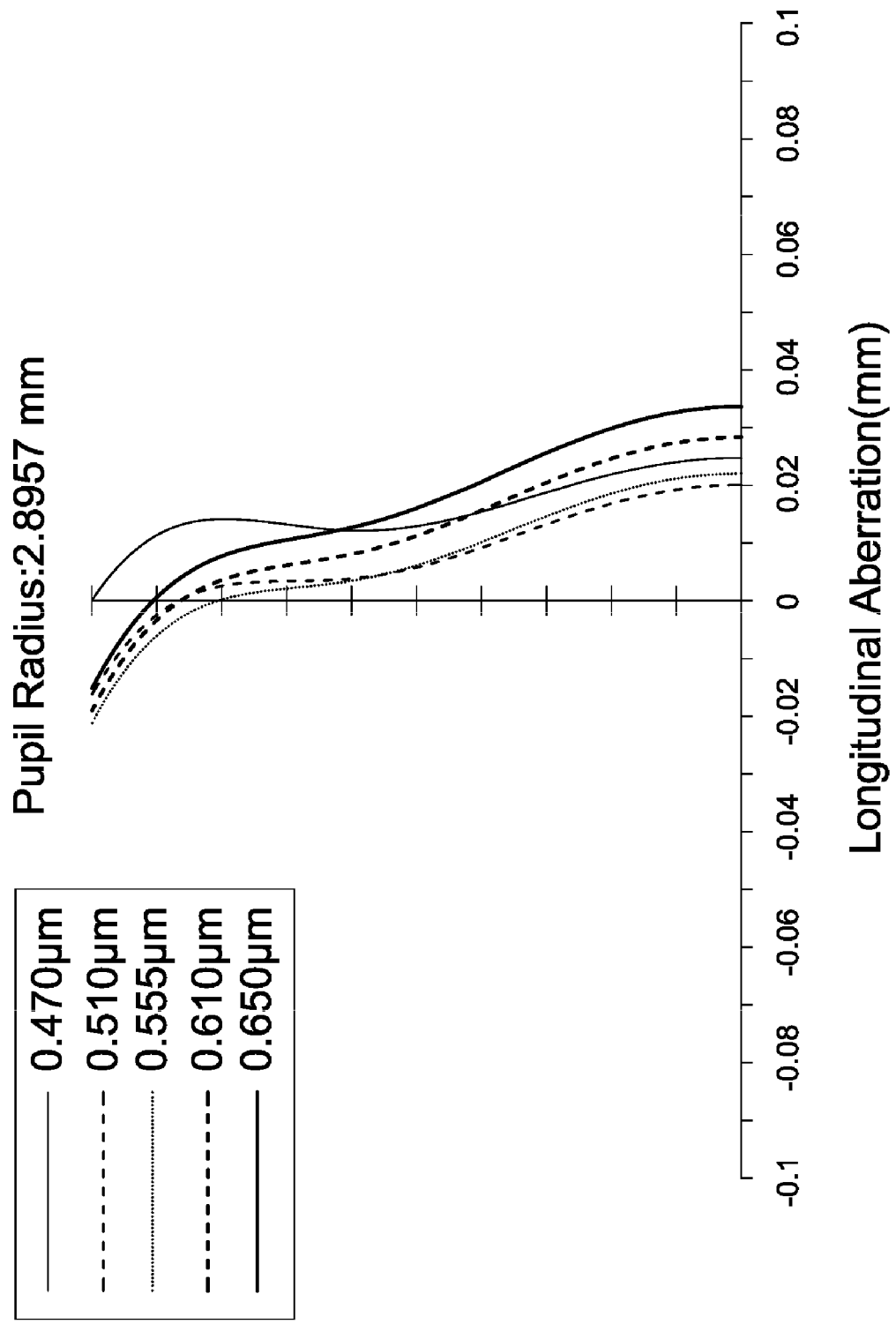

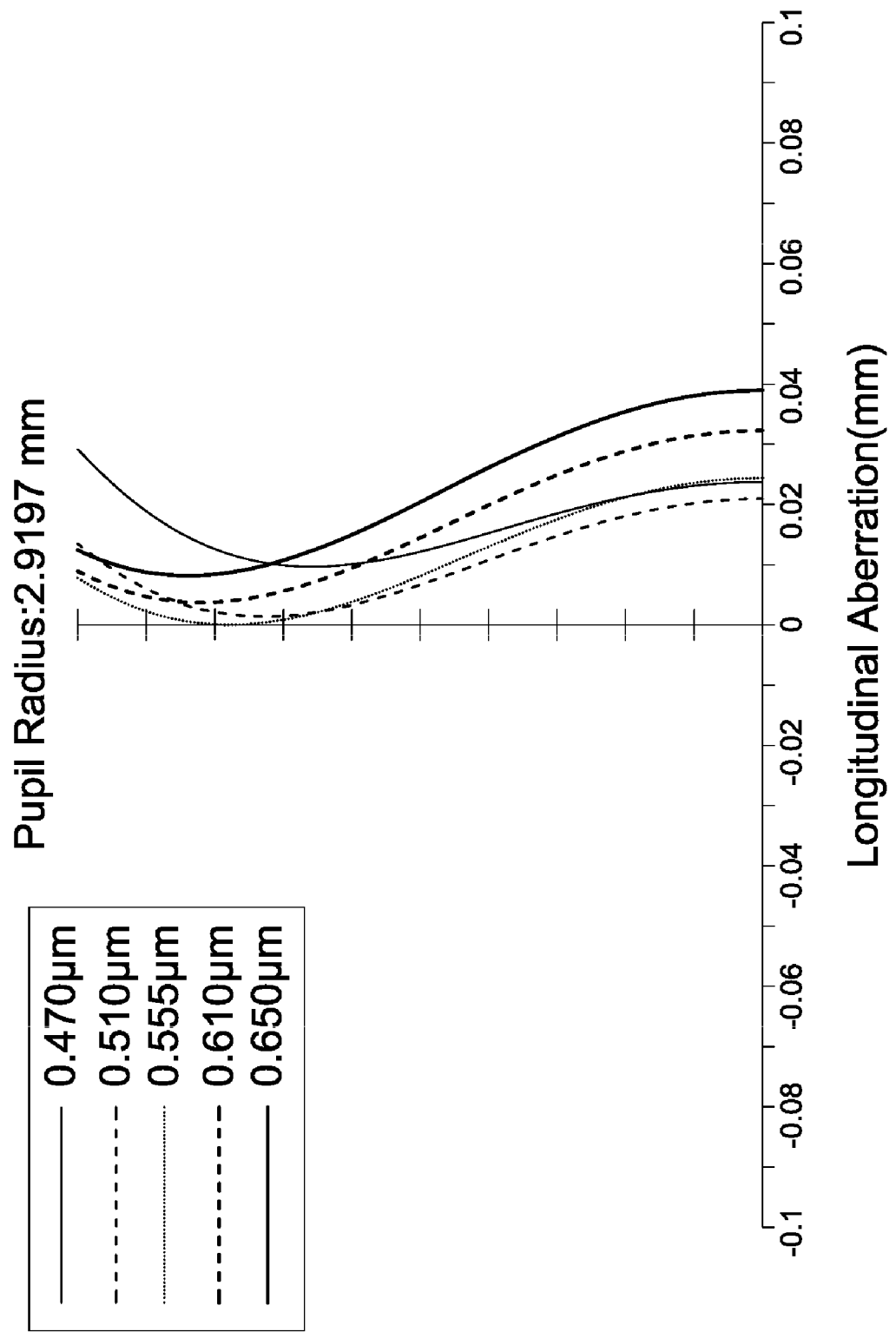

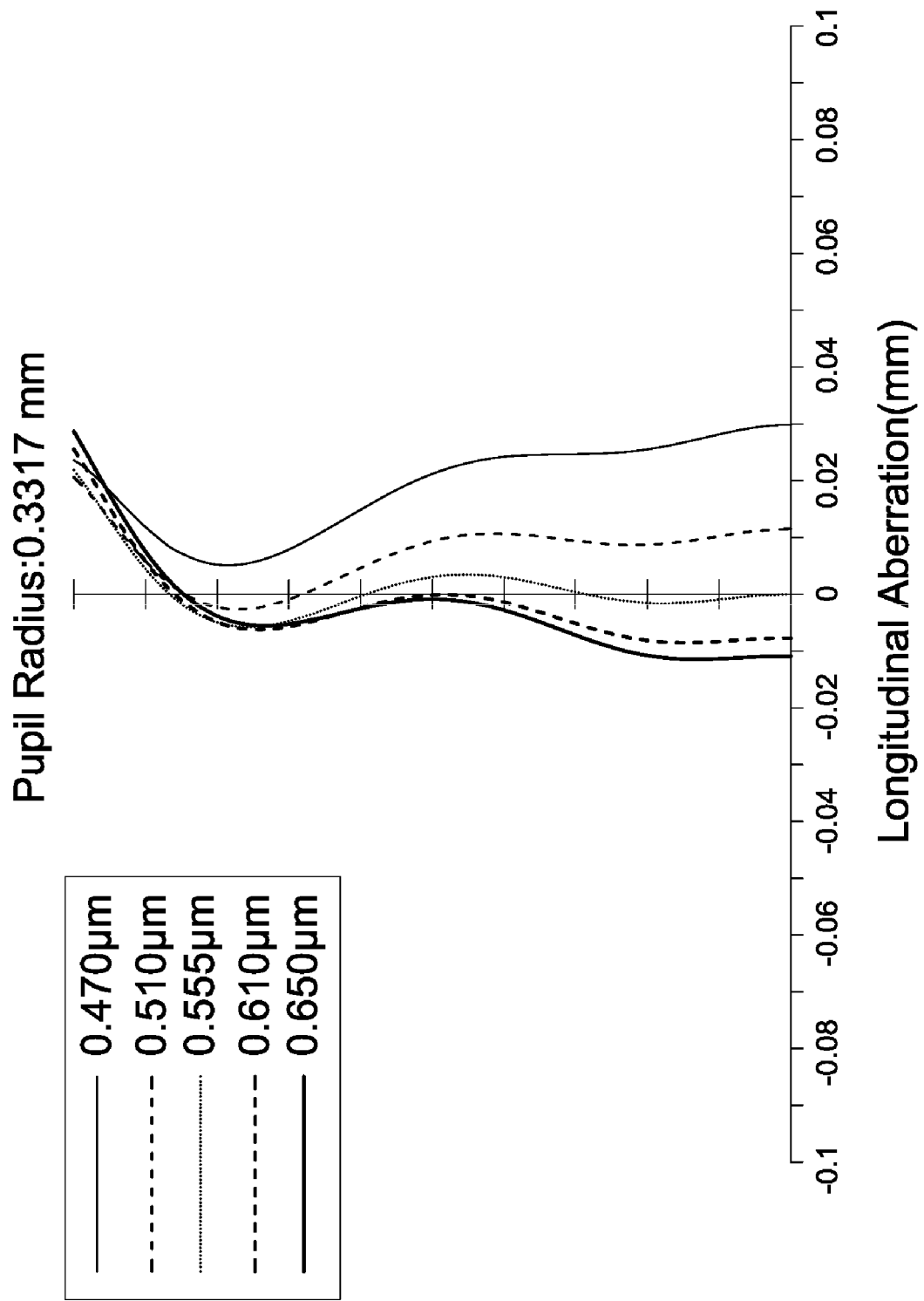

LENS ASSEMBLY

CROSS REFERENCE TO RELATED APPLICATIONS

This Application claims priority of China Patent Application No. 201710835470.3, filed on Sep. 15, 2017, the entirety of which is incorporated by reference herein.

BACKGROUND OF THE INVENTION

Field of the Invention

The invention relates to a lens assembly.

Description of the Related Art

Known six-piece lens assembly usually has a longer total track length, depending on different applications needs, lens assembly has been ability of large aperture and resistance to variations of the ambient temperature. Therefore, a wide-angle lens needs a new structure in order to meet the requirements of the miniaturization, large aperture and resistance to variations of the ambient temperature simultaneously.

BRIEF SUMMARY OF THE INVENTION

The invention provides a lens assembly to solve the above problems. The lens assembly is provided with characteristics of a short total lens length, a smaller F number, a high resolution and a resistance to environment temperature variation, and still has a good optical performance and can meet a requirement.

The lens assembly in accordance with the invention in sequence from an object side to an image side along an optical axis, comprises a first lens is a meniscus with refractive power and includes a convex surface facing the object side and a concave surface facing the image side; a second lens is with negative refractive power and includes a concave surface facing the object side; a third lens is with positive refractive power and includes a convex surface facing the image side; a stop; a fourth lens is with positive refractive power and includes a convex surface facing the image side; a fifth lens is a biconcave lens with negative refractive power; a sixth lens is with positive refractive power and includes a convex surface facing the object side.

The lens assembly satisfies $0.3<f_4/f<3.0$, wherein $f_4$ is a focal length of the fourth lens and f is an effective focal length of the lens assembly.

The lens assembly satisfies $0.3<f_3/f<2.5$, wherein $f_3$ is a focal length of the third lens and f is an effective focal length of the lens assembly.

The lens assembly satisfies $2.1<f_1/f<4.0$, wherein $f_1$ is a focal length of the first lens and f is an effective focal length of the lens assembly.

The lens assembly satisfies $-1.8<f_5/f<-0.2$, wherein $f_5$ is a focal length of the fifth lens and f is an effective focal length of the lens assembly.

The lens assembly satisfies $0.1<|BFL|/TTL<0.5$, wherein BFL is an interval from the image side surface of the sixth lens to an image plane along the optical axis and TTL is an interval from an object side surface of the first lens to the image plane along the optical axis.

The lens assembly satisfies $21.67<Vd_4/Nd_4<36.47$, wherein $Vd_4$ is an Abbe number of the fourth lens and $Nd_4$ is a refractive index of the fourth lens.

The lens assembly satisfies $-3.44<R21/R22<-1.63$, wherein R21 is a radius of curvature of an object side surface of the second lens and R22 is a radius of curvature of an image side surface of the second lens.

The lens assembly satisfies $-7.58<f1+f2<23.66$, wherein $f_1$ is a focal length of the first lens and $f_2$ is a focal length of the second lens.

The first lens with positive refractive power, an object side surface of the fourth lens is convex.

The first lens with negative refractive power, an object side surface of the fourth lens is concave.

An image side surface of the second lens is concave.

An object side surface of the third lens is convex.

An image side surface of the sixth lens is convex.

The fourth lens and the fifth lens are cemented together.

The first lens, the second lens, the third lens, the fourth lens and the fifth lens are spherical glass lens.

The sixth lens is an aspherical glass lens.

The lens assembly in accordance with the invention in sequence from an object side to an image side along an optical axis, comprises a first lens is a meniscus with refractive power and includes a convex surface facing the object side and a concave surface facing the image side; a second lens is with negative refractive power and includes a concave surface facing the object side; a third lens is with positive refractive power and includes a convex surface facing the image side; a fourth lens is with positive refractive power and includes a convex surface facing the image side; a fifth lens is a biconcave lens with negative refractive power; a sixth lens is with positive refractive power and includes a convex surface facing the object side; the lens assembly satisfies $21.67<Vd_4/Nd_4<36.47$, wherein $Vd_4$ is an Abbe number of the fourth lens and $Nd_4$ is a refractive index of the fourth lens.

The lens assembly in accordance with the invention in sequence from an object side to an image side along an optical axis, comprises a first lens is a meniscus with refractive power and includes a convex surface facing the object side and a concave surface facing the image side; a second lens is with negative refractive power and includes a concave surface facing the object side; a third lens is with positive refractive power and includes a convex surface facing the image side; a fourth lens is with positive refractive power and includes a convex surface facing the image side; a fifth lens is a biconcave lens with negative refractive power; a sixth lens is with positive refractive power and includes a convex surface facing the object side; the lens assembly satisfies $-7.58<f1+f2<23.66$, wherein $f_1$ is a focal length of the first lens and $f_2$ is a focal length of the second lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2A is a longitudinal spherical aberration diagram of a lens assembly in accordance with the first embodiment of the invention;

FIG. 4A is a longitudinal spherical aberration diagram of a lens assembly in accordance with the second embodiment of the invention;

FIG. 6A is a longitudinal spherical aberration diagram of a lens assembly in accordance with the third embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
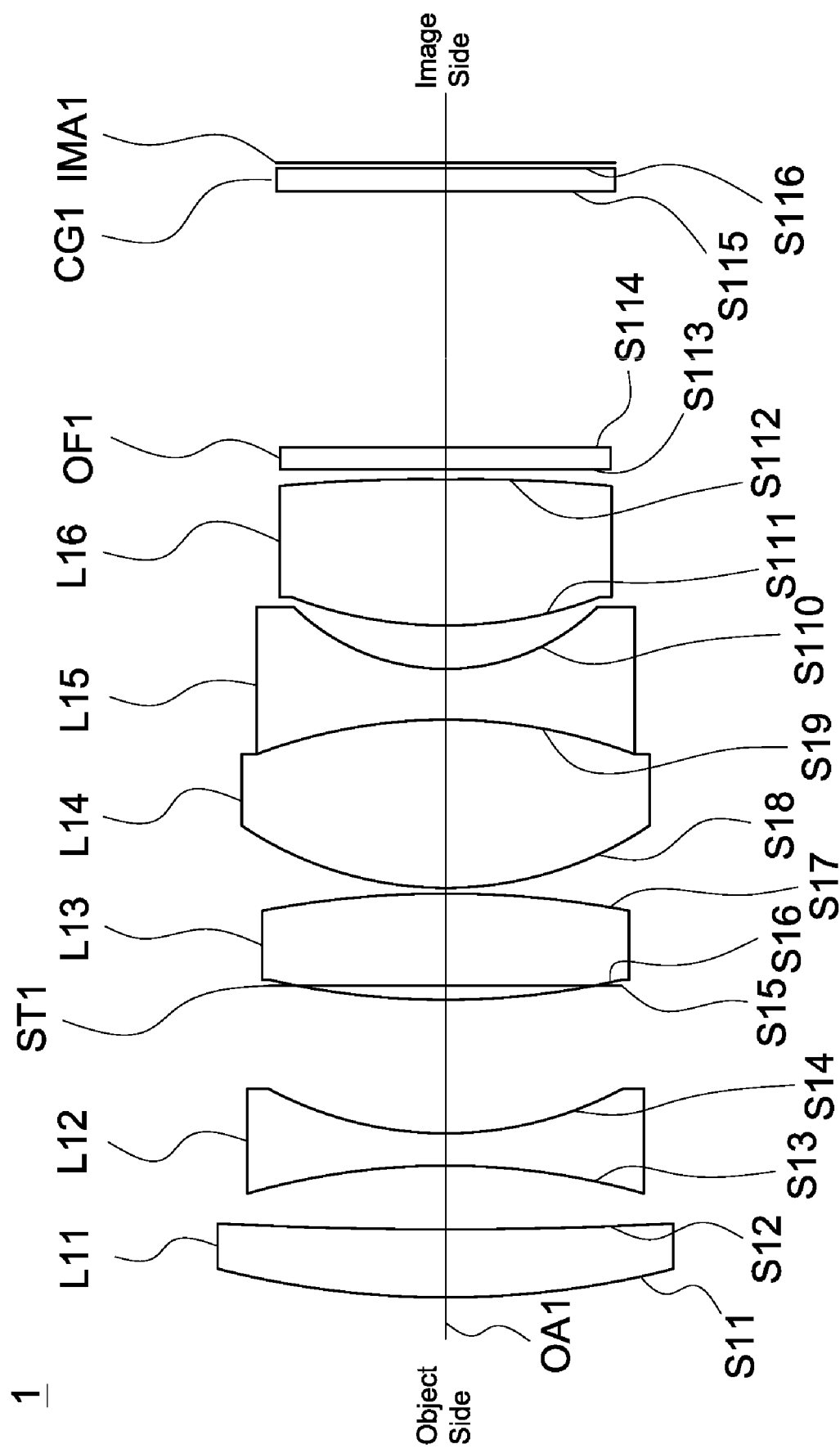
FIG. 1 is a lens layout and optical path diagram of a lens assembly in accordance with a first embodiment of the invention.

Referring to FIG. 1, FIG. 1 is a lens layout and optical path diagram of a lens assembly 1 in accordance with a first embodiment of the invention. The lens assembly 1 includes a first lens L11, a second lens L12, a stop ST1, a third lens L13, a fourth lens L14, a fifth lens L15, a sixth lens L16, an optical filter OF1 and a cover glass CG1, all of which are arranged in sequence from an object side to an image side along an optical axis OA1. In operation, an image of light rays from the object side is formed at an image plane IMA1.

The first lens L11 is a meniscus lens with positive refractive power and made of glass material, wherein the object side surface S11 is a convex surface, the image side surface S12 is a concave surface and both of the object side surface S11 and image side surface S12 are spherical surfaces. The second lens L12 is a biconcave lens with negative refractive power and made of glass material, wherein the object side surface S13 is a concave surface, the image side surface S14 is a concave surface and both of the object side surface S13 and image side surface S14 are spherical surfaces. The third lens L13 is a biconvex lens with positive refractive power and made of glass material, wherein the object side surface S16 is a convex surface, the image side surface S17 is a convex surface and both of the object side surface S16 and image side surface S17 are spherical surfaces. The fourth lens L14 is a biconvex lens with positive refractive power and made of glass material, wherein the object side surface S18 is a convex surface, the image side surface S19 is a convex surface and both of the object side surface S18 and image side surface S19 are spherical surfaces. The fifth lens L15 is a biconcave lens with negative refractive power and made of glass material, wherein the object side surface S19 is a concave surface, the image side surface S110 is a concave surface and both of the object side surface S19 and image side surface S110 are spherical surfaces. The sixth lens L16 is a biconvex lens with positive refractive power and made of glass material, wherein the object side surface S111 is a convex surface, the image side surface S112 is a convex surface and both of the object side surface S111 and image side surface S112 are aspheric surfaces. The fourth lens L14 and the fifth lens L15 are cemented together. Both of the object side surface S113 and image side surface S114 of the optical filter OF1 are plane surfaces. Both of the object side surface S115 and image side surface S116 of the cover glass CG1 are plane surfaces.

In order to maintain excellent optical performance of the lens assembly 1 in accordance with the first embodiment of the invention, the lens assembly 1 satisfies at least one of the following conditions:

$$2.1<|f1_1/f1|<4.0 \qquad (1)$$

$$0.3<f1_3/f1<2.5 \qquad (2)$$

$$0.3<f1_4/f1<3.0 \qquad (3)$$

$$-1.8<f1_5/f1<-0.2 \qquad (4)$$

$$0.1<|BFL1/TTL1|<0.5 \qquad (5)$$

Wherein f1 is an effective focal length of the lens assembly 1, $f1_1$ is an effective focal length of the first lens L11, $f1_3$ is an effective focal length of the third lens L13, $f1_4$ is an effective focal length of the fourth lens L14, $f1_5$ is an effective focal length of the fifth lens L15, BFL1 is an interval from the image side S112 of the sixth lens L16 to the image plane IMA1 along the optical axis OA1, and TTL1 is an interval from the object surface S11 of the first lens L11 to the image plane IMA1 along the optical axis OA1.

By the above design of the lenses and stop ST1, the lens assembly 1 is provided with a shortened total lens length, a decreased F-number, an increased resolution, an effective corrected aberration and a resistance to severe environment temperature change on image quality.

If the condition (1), absolute value of $f1_1-f1$, is less than 2.1, manufacturability of the lens assembly 1 is not good enough. Accordingly, the absolute value of $f1_1-f1$ has to be at least greater than 2.1. A preferred range is $2.1<|f1_1/f1|<4.0$. An absolute value within this range can better achieve the balance between the optical performance and the manufacturability. If the absolute value of $f1_1-f1$ increases, better manufacturability is obtained. If the absolute value of $f1_1-f1$ decreases, better image resolving ability in peripheral regions is obtained.

In order to achieve the above purposes and effectively enhance the optical performance, the lens assembly 1 in accordance with the first embodiment of the invention is provided with the optical specifications shown in Table 1, which include the effective focal length, F-number, total lens length, radius of curvature of each lens surface in mm, thickness between adjacent surface in mm, refractive index of each lens and Abbe number of each lens. Table 1 shows that the effective focal length is equal to 9.6 mm, F-number is equal to 1.6, total lens length is equal to 20.99 mm, and angle of half field of view is equal to 28.4° for the lens assembly 1 of the first embodiment of the invention.

TABLE 1

Effective Focal Length = 9.600 mm
F-number = 1.6
Total Lens Length = 20.99 mm
Angle of Half Field of View = 28.4°

| Surface Number | Radius of Curvature (mm) | Thickness (mm) | Nd | Vd | Remark |
|---|---|---|---|---|---|
| S11 | 17.29 | 1.245029 | 1.834 | 37.16 | The First Lens L11 |
| S12 | 83.75387 | 1.184684 | | | |
| S13 | −12.96307 | 0.6 | 1.548 | 45.78 | The Second Lens L12 |
| S14 | 6.887592 | 2.719193 | | | |
| S15 | ∞ | −0.25399 | | | Stop ST1 |
| S16 | 14.59255 | 1.978893 | 1.595 | 67.74 | The Third Lens L13 |
| S17 | −18.14406 | 0.094441 | | | |
| S18 | 6.594875 | 3.109969 | 1.883 | 40.81 | The fourth L14 |
| S19 | −10.03043 | 0.960426 | 1.728 | 28.46 | The fifth L15 |
| S110 | 3.981782 | 0.791114 | | | |
| S111 | 6.871315 | 2.71177 | 1.592 | 67.21 | The sixth L16 |
| S112 | −50.45877 | 0.2 | | | |
| S113 | ∞ | 0.4 | 1.517 | 64.17 | Optical Filter OF1 |
| S114 | ∞ | 4.750872 | | | |
| S115 | ∞ | 0.4 | 1.517 | 64.17 | Cover Glass CG1 |
| S116 | ∞ | 0.1 | | | |

The aspheric surface sag z of each lens in Table 1 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the first embodiment, the conic constant k and the aspheric coefficients A, B, C, D and E of each surface are shown in Table 2.

TABLE 2

| Surface Number | k | A | B | C | D | E |
|---|---|---|---|---|---|---|
| S111 | −9.952 | −0.023817 | −1.06E−02 | −8.68E−03 | −1.27E−01 | 2.79E−02 |
| S112 | −8.554 | 0 | 0.0723 | −0.000017 | 2.28E−04 | −3.73E−01 |

Table 3 shows the parameter value and the calculated value of the above conditions (1)-(5). For the lens assembly 1 of the first embodiment which respectively satisfy the above conditions (1)-(5) as can be seen from table 3.

TABLE 3

| f1 | 9.600 mm | $f1_1$ | | 25.779 mm | $f1_3$ | 13.864 mm |
|---|---|---|---|---|---|---|
| $f1_4$ | 4.919 mm | $f1_5$ | | −3.78 mm | BFL1 | 5.851 mm |
| TTL1 | 20.99 mm | | | | | |
| $|f1_1/f1|$ | 2.685 | $f1_3/f1$ | | 1.444 | $f1_4/f1$ | 0.512 |
| $f1_5/f1$ | −0.394 | $|BFL/TTL|$: | | 0.279 | | |

Figure 2B:
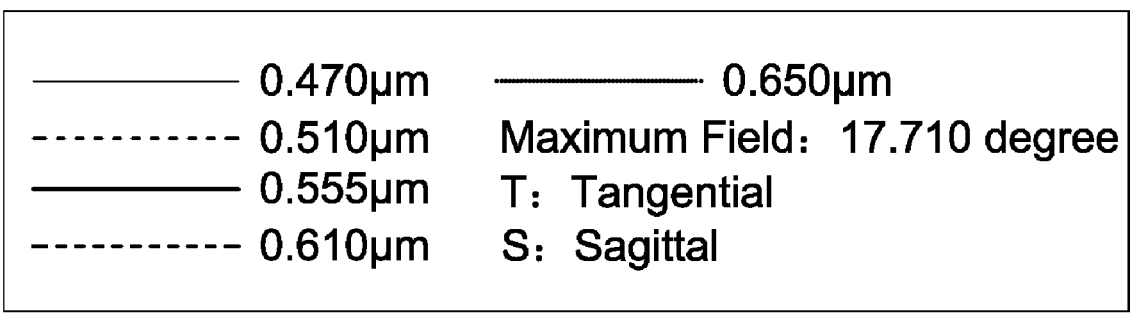
FIG. 2B is an astigmatic field curvature diagram of a lens assembly in accordance with the first embodiment of the invention.
Figure 2B:
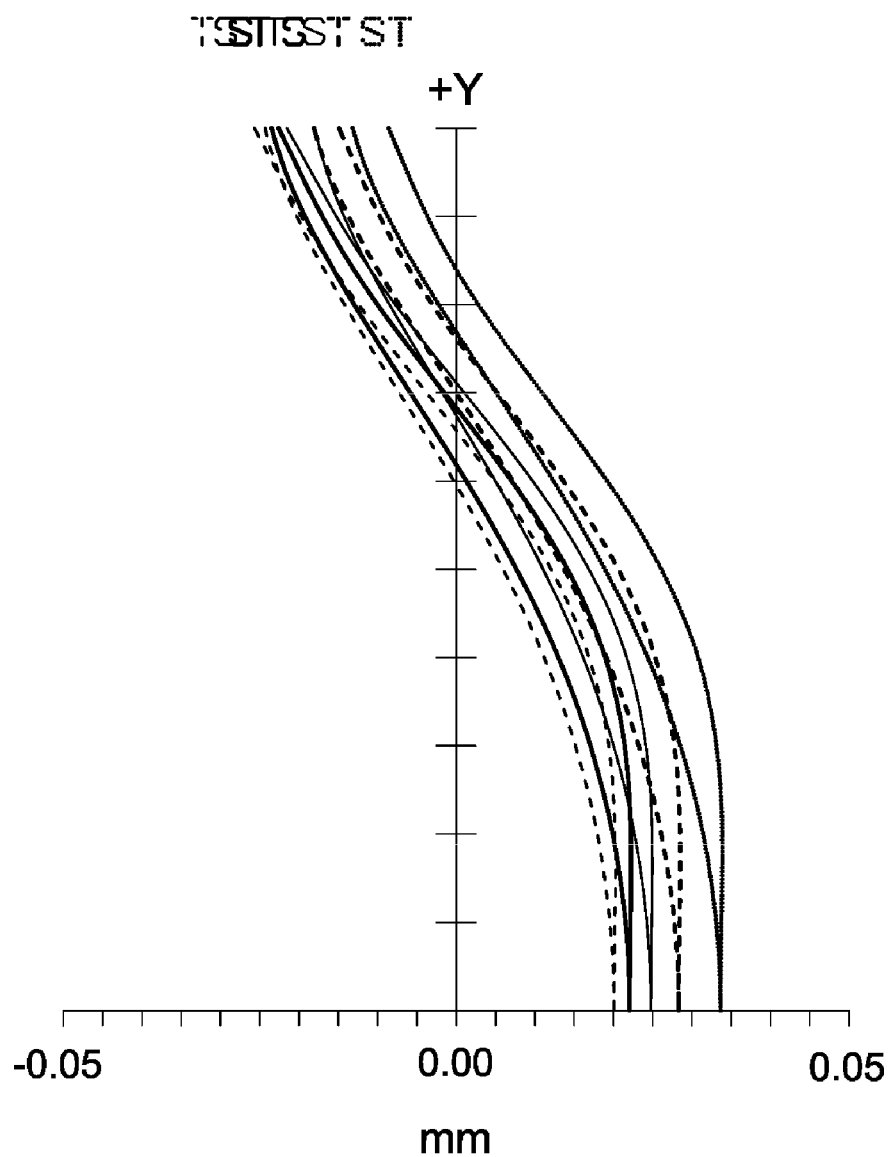
Figure 2C:
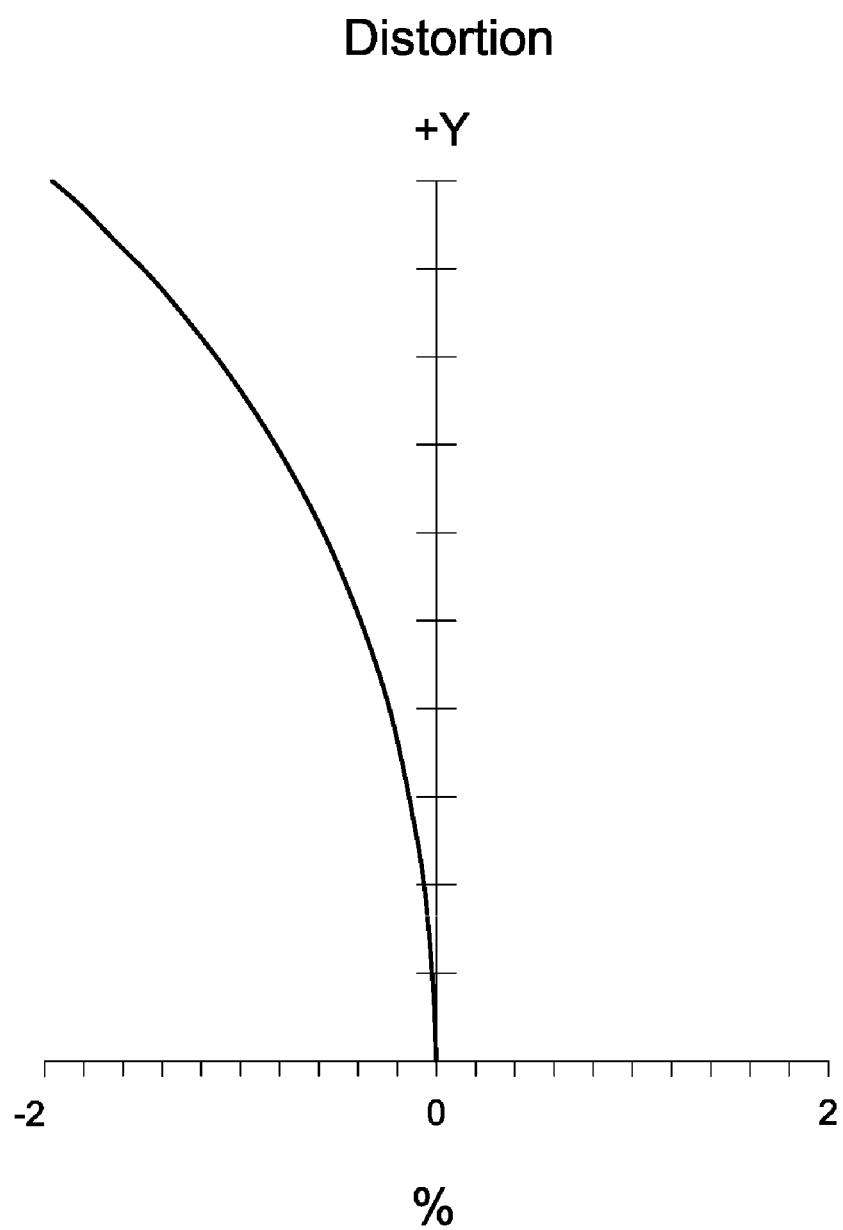
FIG. 2C is a distortion diagram of a lens assembly in accordance with the first embodiment of the invention.
Figure 2D:
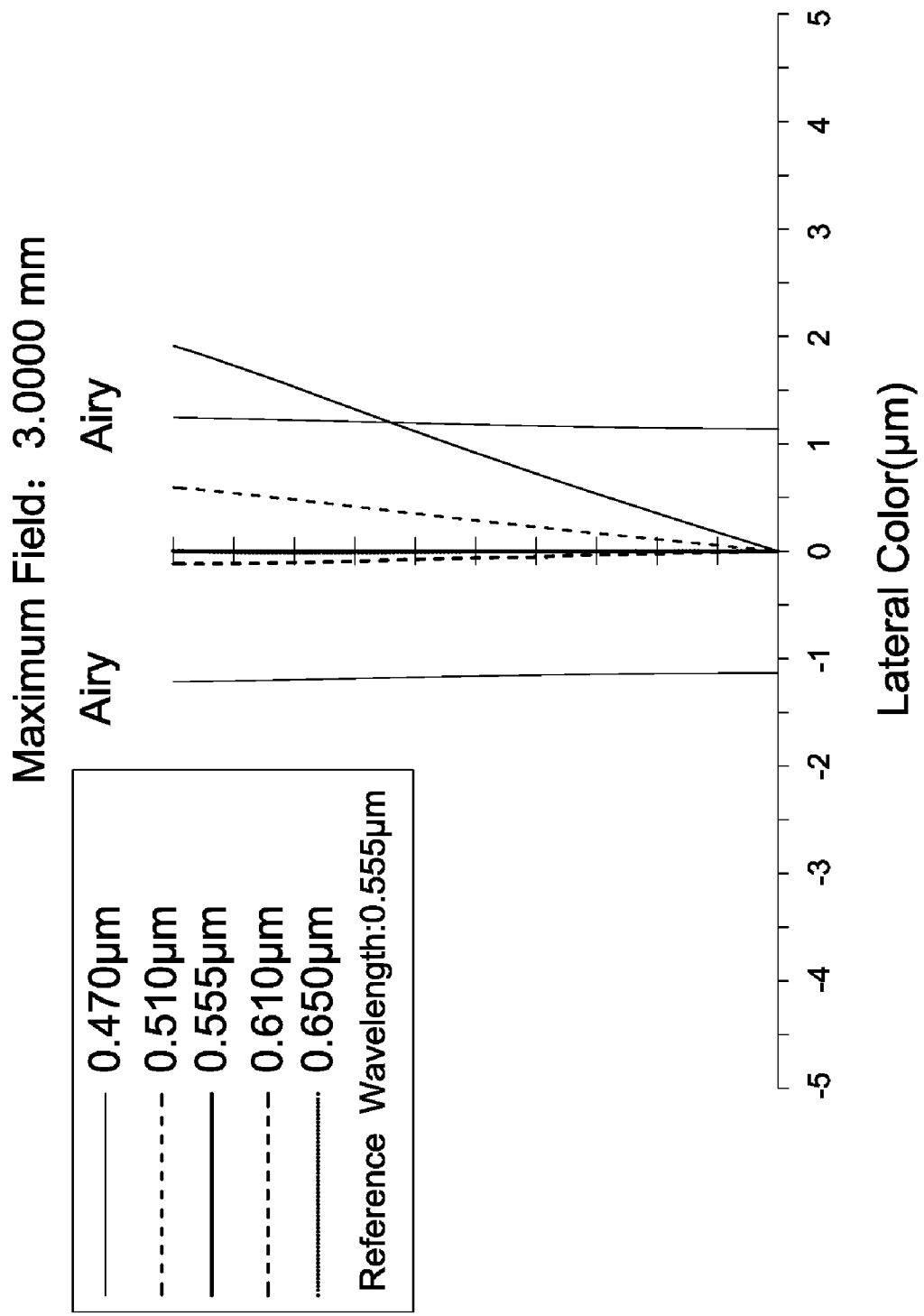
FIG. 2D is a lateral color diagram of a lens assembly in accordance with the first embodiment of the invention.
Figure 2E:
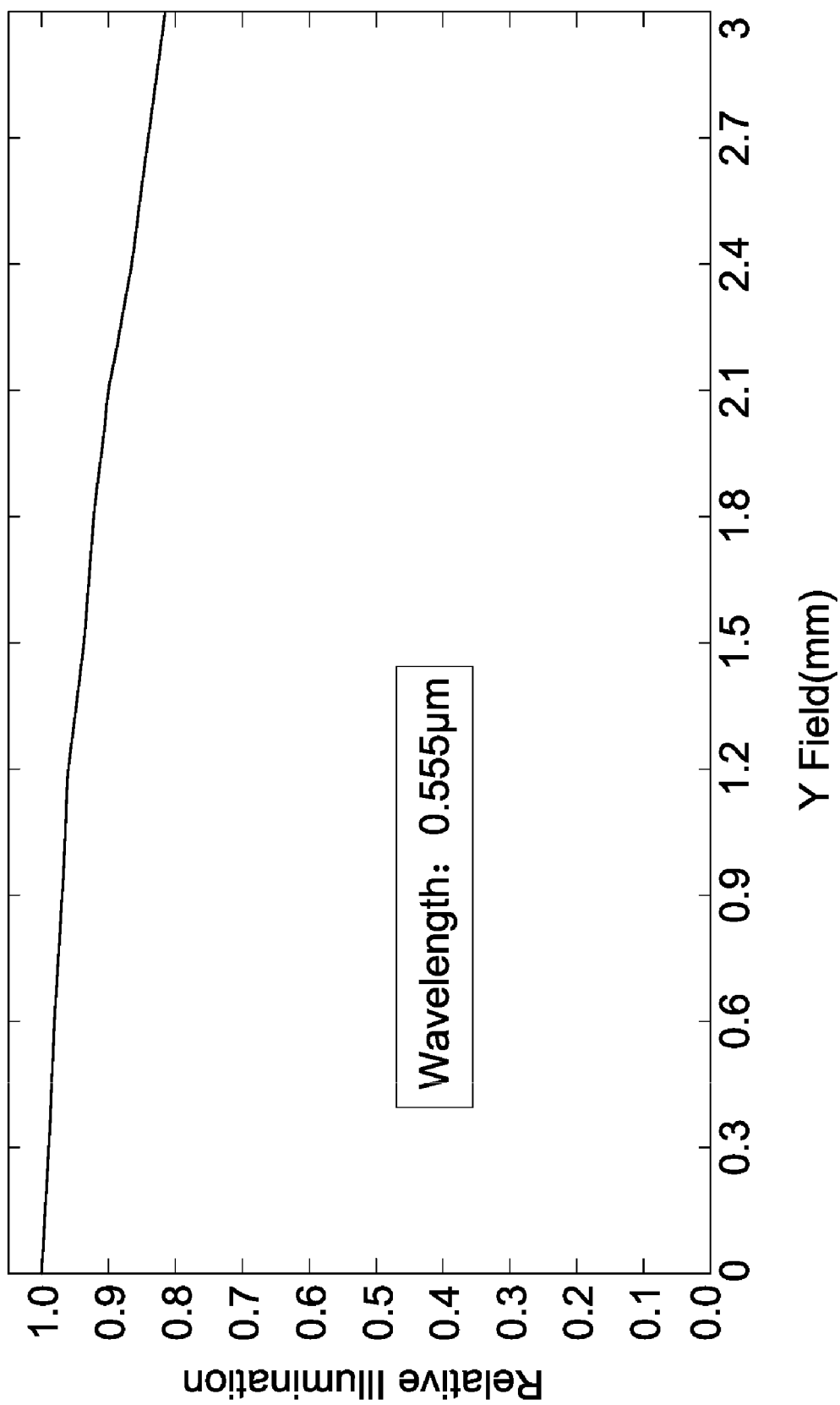
FIG. 2E is a relative illumination diagram of a lens assembly in accordance with the first embodiment of the invention.
Figure 2F:
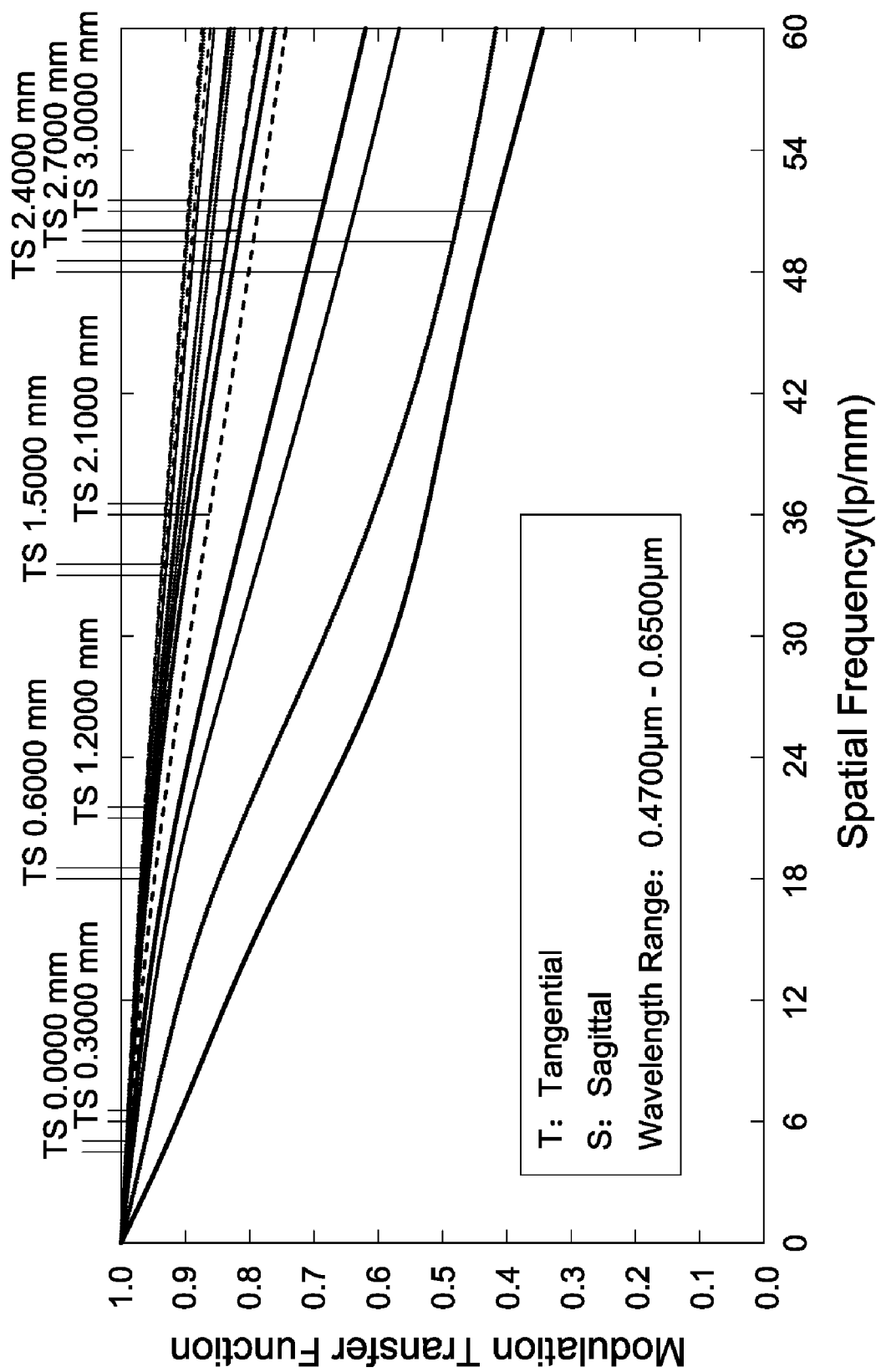
FIG. 2F is a modulation transfer function diagram of a lens assembly in accordance with the first embodiment of the invention.
Figure 2G:
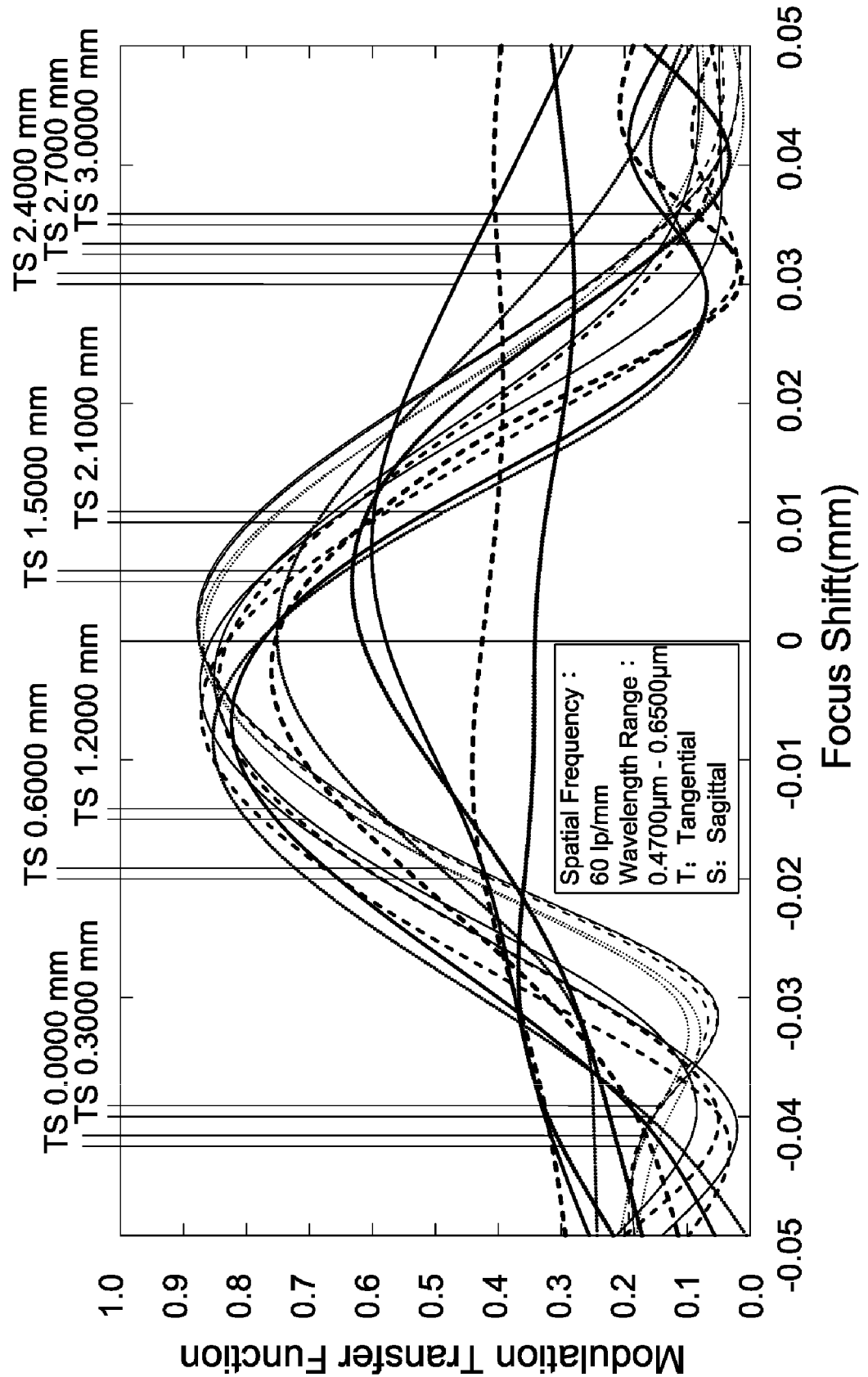
FIG. 2G is a through focus modulation transfer function diagram of a lens assembly in accordance with the first embodiment of the invention.

By the above arrangements of the lenses and stop ST1, the lens assembly 1 of the first embodiment can meet the requirements of optical performance as seen in FIGS. 2A-2G, wherein FIG. 2A shows a longitudinal aberration diagram of the lens assembly 1 in accordance with the first embodiment of the invention, FIG. 2B shows a field curvature diagram of the lens assembly 1 in accordance with the first embodiment of the invention, FIG. 2C shows a distortion diagram of the lens assembly 1 in accordance with the first embodiment of the invention, FIG. 2D shows a lateral color diagram of the lens assembly 1 in accordance with the first embodiment of the invention, FIG. 2E shows a relative illumination diagram of the lens assembly 1 in accordance with the first embodiment of the invention, FIG. 2F shows a modulation transfer function diagram of the lens assembly 1 in accordance with the first embodiment of the invention and FIG. 2G shows a through focus modulation transfer function diagram of the lens assembly 1 in accordance with the first embodiment of the invention.

It can be seen from FIG. 2A that the longitudinal aberration in the lens assembly 1 of the first embodiment ranges from −0.025 mm to 0.035 mm for the wavelength of 0.470 μm, 0.510 μm, 0.555 μm, 0.610 μm, and 0.650 μm. It can be seen from FIG. 2B that the field curvature of tangential direction and sagittal direction in the lens assembly 1 of the first embodiment ranges from −0.03 mm to 0.035 mm for the wavelength of 0.470 μm, 0.510 μm, 0.555 μm, 0.610 μm, and 0.650 μm. It can be seen from FIG. 2C (in which the fifth lines in the figure almost coincide to appear as if a signal line) that the distortion in the lens assembly 1 of the first embodiment ranges from −2% to 0% for the wavelength of 0.470 μm, 0.510 μm, 0.555 μm, 0.610 μm, and 0.650 μm. It can be seen from FIG. 2D that the lateral color in the lens assembly 1 of the first embodiment ranges from −0.5 μm to 2.0 μm, a maximum field height is equal to 3.0000 mm for the wavelength of 0.470 μm, 0.510 μm, 0.555 μm, 0.610 μm, and 0.650 μm. It can be seen from FIG. 2E that the relative illumination in the lens assembly 1 of the first embodiment ranges from −0.025 mm to 0.035 mm when the wavelength is 0.555 μm and Y-field ranges from 0 mm to 3 mm. It can be seen from FIG. 2F that the modulation transfer function of tangential direction and sagittal direction in the lens assembly 1 of the first embodiment ranges from 0.35 to 1.0 when the wavelength ranges from 0.4700 μm to 0.6500 μm, the fields respectively are 0.0000 mm, 0.3000 mm, 0.6000 mm, 1.2000 mm, 1.5000 mm, 2.1000 mm, 2.4000 mm, 2.7000 mm, 3.0000 mm, and the spatial frequency ranges from 0 lp/mm to 60 lp/mm. It can be seen from FIG. 2G that the through focus modulation transfer function of tangential direction and sagittal direction in the lens assembly 1 of the first embodiment ranges is greater than 0.2 as focus shift ranges from −0.025 mm to 0.021 mm wherein the wavelength ranges from 0.4700 μm to 0.6500 μm, the fields respectively are 0.0000 mm, 0.3000 mm, 0.6000 mm, 1.2000 mm, 1.5000 mm, 2.1000 mm, 2.4000 mm, 2.7000 mm, 3.0000 mm, and the spatial frequency is equal to 60 lp/mm. It is obvious that the longitudinal aberration, the field curvature, the distortion and the lateral color of the lens assembly 1 of the first embodiment can be corrected effectively, and the relative illumination, the resolution and the depth of focus of the lens assembly 1 of the first embodiment can meet the requirement, thereby capable of good optical performance.

Figure 3:
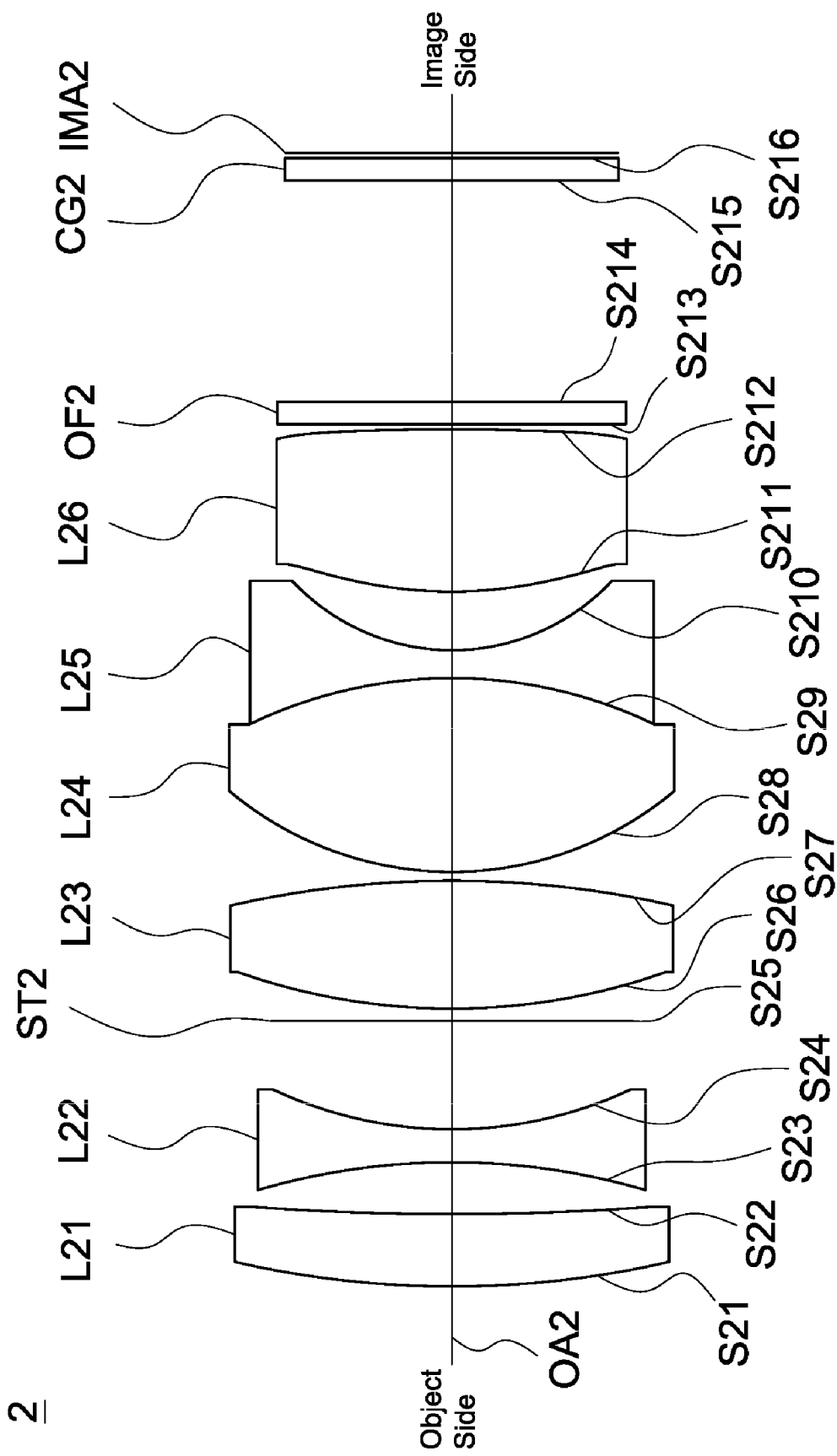
FIG. 3 is a lens layout and optical path diagram of a lens assembly in accordance with a second embodiment of the invention.

Referring to FIG. 3, FIG. 3 is a lens layout and optical path diagram of a lens assembly 2 in accordance with a second embodiment of the invention. The lens assembly 2 includes a first lens L21, a second lens L22, a stop ST2, a third lens L23, a fourth lens L24, a fifth lens L25, a sixth lens L26, an optical filter OF2 and a cover glass CG2, all of which are arranged in sequence from an object side to an image side along an optical axis OA2. In operation, an image of light rays from the object side is formed at an image plane IMA2.

The first lens L21 is a meniscus lens with positive refractive power and made of glass material, wherein the object side surface S21 is a convex surface, the image side surface S22 is a concave surface and both of the object side surface S21 and image side surface S22 are spherical surfaces. The second lens L22 is a biconcave lens with negative refractive power and made of glass material, wherein the object side surface S23 is a concave surface, the image side surface S24 is a concave surface and both of the object side surface S23 and image side surface S24 are spherical surfaces. The third lens L23 is a biconvex lens with positive refractive power and made of glass material, wherein the object side surface S26 is a convex surface, the image side surface S27 is a convex surface and both of the object side surface S26 and image side surface S27 are spherical surfaces. The fourth lens L24 is a biconvex lens with positive refractive power and made of glass material, wherein the object side surface S28 is a convex surface, the image side surface S29 is a convex surface and both of the object side surface S28 and image side surface S29 are spherical surfaces. The fifth lens L25 is a biconcave lens with negative refractive power and made of glass material, wherein the object side surface S29 is a concave surface, the image side surface S210 is a concave surface and both of the object side surface S29 and image side surface S210 are spherical surfaces. The sixth lens L26 is a biconvex lens with positive refractive power and made of glass material, wherein the object side surface S211 is a convex surface, the image side surface S212 is a convex surface and both of the object side surface S211 and image side surface S212 are aspheric surfaces. The fourth lens L24 and the fifth lens L25 are cemented together. Both of the object side surface S213 and image side surface S214 of the optical filter OF2 are plane surfaces. Both of the object side surface S215 and image side surface S216 of the cover glass CG2 are plane surfaces.

In order to maintain excellent optical performance of the lens assembly 2 in accordance with the second embodiment of the invention, the lens assembly 2 satisfies at least one of the following conditions:

$$2.1 < |f2_1/f2| < 4.0 \quad (6)$$

$$0.3 < f2_3/f2 < 2.5 \quad (7)$$

$$0.3 < f2_4/f2 < 3.0 \quad (8)$$

$$-1.8 < f2_5/f2 < -0.2 \quad (9)$$

$$0.1 < |BFL2/TTL2| < 0.5 \quad (10)$$

Wherein f2 is an effective focal length of the lens assembly 2, $f2_1$ is an effective focal length of the first lens L21, $f2_3$ is an effective focal length of the third lens L23, $f2_4$ is an effective focal length of the fourth lens L24, $f2_5$ is an effective focal length of the fifth lens L25, BFL2 is an interval from the image side S212 of the sixth lens L26 to the image plane IMA2 along the optical axis OA2, and TTL2 is an interval from the object surface S21 of the first lens L21 to the image plane IMA2 along the optical axis OA2.

By the above design of the lenses and stop ST2, the lens assembly 2 is provided with a shortened total lens length, a decreased F-number, an increased resolution, an effective corrected aberration and a resistance to severe environment temperature change on image quality.

If the condition (7), value of $f2_3-f2$, is less than 0.3, manufacturability of the lens assembly 2 is not good enough. Accordingly, the value of $f2_3-f2$ has to be at least greater than 0.3. A preferred range is $0.3<f2_3/f2<2.5$. An value within this range can better achieve the balance between the optical performance and the manufacturability. If the value of $f2_3-f2$ increases, better manufacturability is obtained. If the value of $f2_3-f2$ decreases, better image resolving ability in peripheral regions is obtained.

In order to achieve the above purposes and effectively enhance the optical performance, the lens assembly 2 in accordance with the second embodiment of the invention is provided with the optical specifications shown in Table 4, which include the effective focal length, F-number, total lens length, radius of curvature of each lens surface in mm, thickness between adjacent surface in mm, refractive index of each lens and Abbe number of each lens. Table 4 shows that the effective focal length is equal to 9.6 mm, F-number is equal to 1.6, total lens length is equal to 20.5 mm, and angle of half field of view is equal to 28.4° for the lens assembly 2 of the second embodiment of the invention.

TABLE 4

Effective Focal Length = 9.600 mm
F-number = 1.6
Total Lens Length = 20.5 mm
Angle of Half Field of View = 28.4°

| Surface Number | Radius of Curvature (mm) | Thickness (mm) | Nd | Vd | Remark |
|---|---|---|---|---|---|
| S21 | 17.46979 | 1.308647 | 1.835 | 42.71 | The First Lens L21 |
| S22 | 49.53254 | 0.9353459 | | | |
| S23 | −12.26866 | 0.6 | 1.581 | 40.75 | The Second Lens L22 |
| S24 | 7.52243 | 1.95677 | | | |
| S25 | ∞ | 0.2176778 | | | Stop ST2 |
| S26 | 11.36552 | 2.323933 | 1.835 | 42.71 | The Third Lens L23 |
| S27 | −17.60659 | 0.15 | | | |
| S28 | 6.156735 | 3.511618 | 1.678 | 55.34 | The fourth L24 |
| S29 | −8.265578 | 0.5 | 1.717 | 29.52 | The fifth L25 |
| S210 | 3.895966 | 1.064739 | | | |
| S211 | 7.918934 | 2.931269 | 1.678 | 55.34 | The sixth L26 |
| S212 | −50 | 0.09997085 | | | |
| S213 | ∞ | 0.4 | 1.517 | 64.17 | Optical Filter OF2 |

TABLE 4-continued

Effective Focal Length = 9.600 mm
F-number = 1.6
Total Lens Length = 20.5 mm
Angle of Half Field of View = 28.4°

| Surface Number | Radius of Curvature (mm) | Thickness (mm) | Nd | Vd | Remark |
|---|---|---|---|---|---|
| S214 | ∞ | 4.000029 | | | |
| S215 | ∞ | 0.4 | 1.517 | 64.17 | Cover Glass CG2 |
| S216 | ∞ | 0.1 | | | |

The aspheric surface sag z of each lens in Table 4 can be calculated by the following formula:

$$z=ch^2/\{1+[1-(k+1)c^2h^2]^{1/2}\}+Ah^4+Bh^6+Ch^8+Dh^{10}+Eh^{12}$$

where c is curvature, h is the vertical distance from the lens surface to the optical axis, k is conic constant and A, B, C, D and E are aspheric coefficients.

In the first embodiment, the conic constant k and the aspheric coefficients A, B, C, D and E of each surface are shown in Table 5.

TABLE 5

| Surface Number | k | A | B | C | D | E |
|---|---|---|---|---|---|---|
| S211 | −9.109748 | 0.21715 | −0.174 | 5.83E−04 | 1.39E−03 | −1.05E−09 |
| S212 | 0 | 0.213586 | −7.09E−03 | 1.17E−02 | −2.55E−01 | 1.10E−01 |

Table 6 shows the parameter value and the calculated value of the above conditions (6)-(10). For the lens assembly 2 of the second embodiment which respectively satisfy the above conditions (6)-(10) as can be seen from table 6.

TABLE 6

| f2 | 9.600 mm | $f2_1$ | 31.604 mm | $f2_3$ | 8.551 mm |
|---|---|---|---|---|---|
| $f2_4$ | 5.755 mm | $f2_5$ | −3.607 mm | BFL2 | 5.000 mm |
| TTL2 | 20.5 mm | | | | |
| $|f2_1/f2|$ | 3.292 | $f2_3/f2$ | 0.891 | $f2_4/f2$ | 0.599 |
| $f2_5/f2$ | −0.376 | $|BFL2/TTL2|$ | 0.244 | | |

Figure 4B:
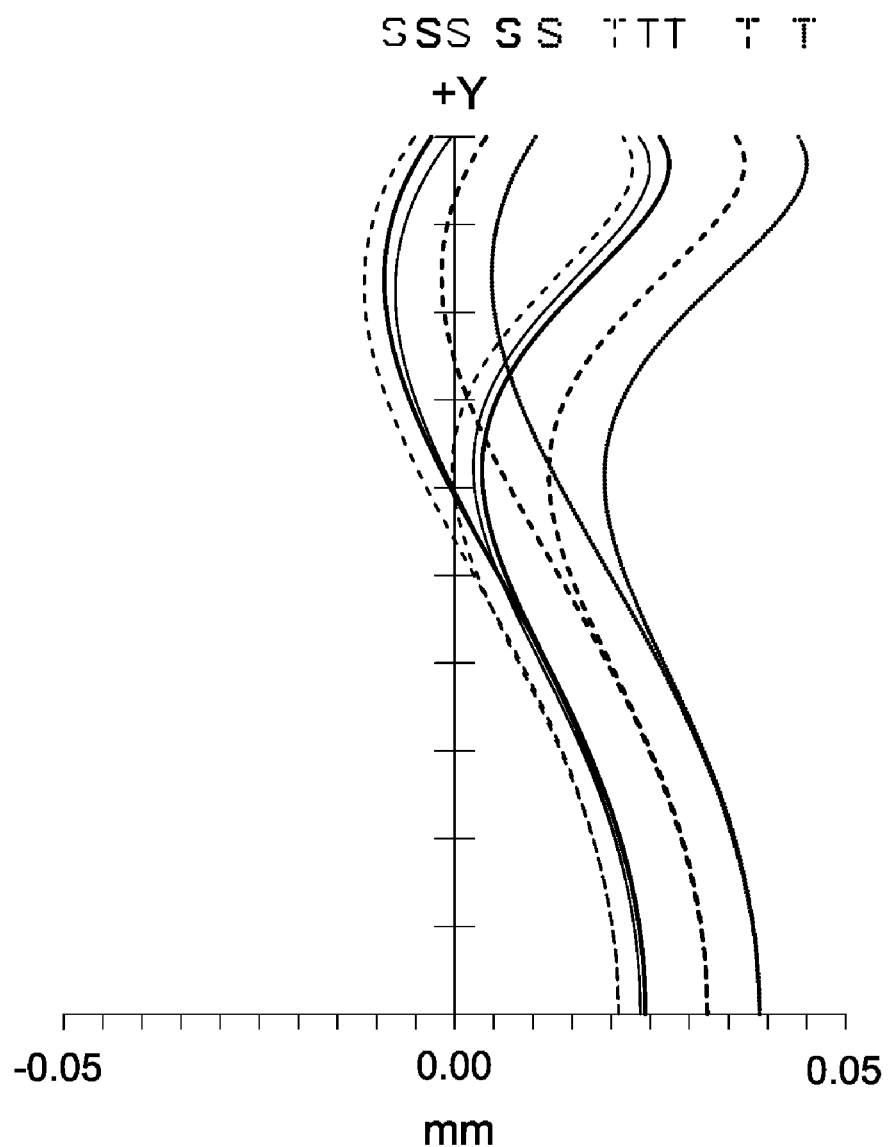
FIG. 4B is an astigmatic field curvature diagram of a lens assembly in accordance with the second embodiment of the invention.
Figure 4C:
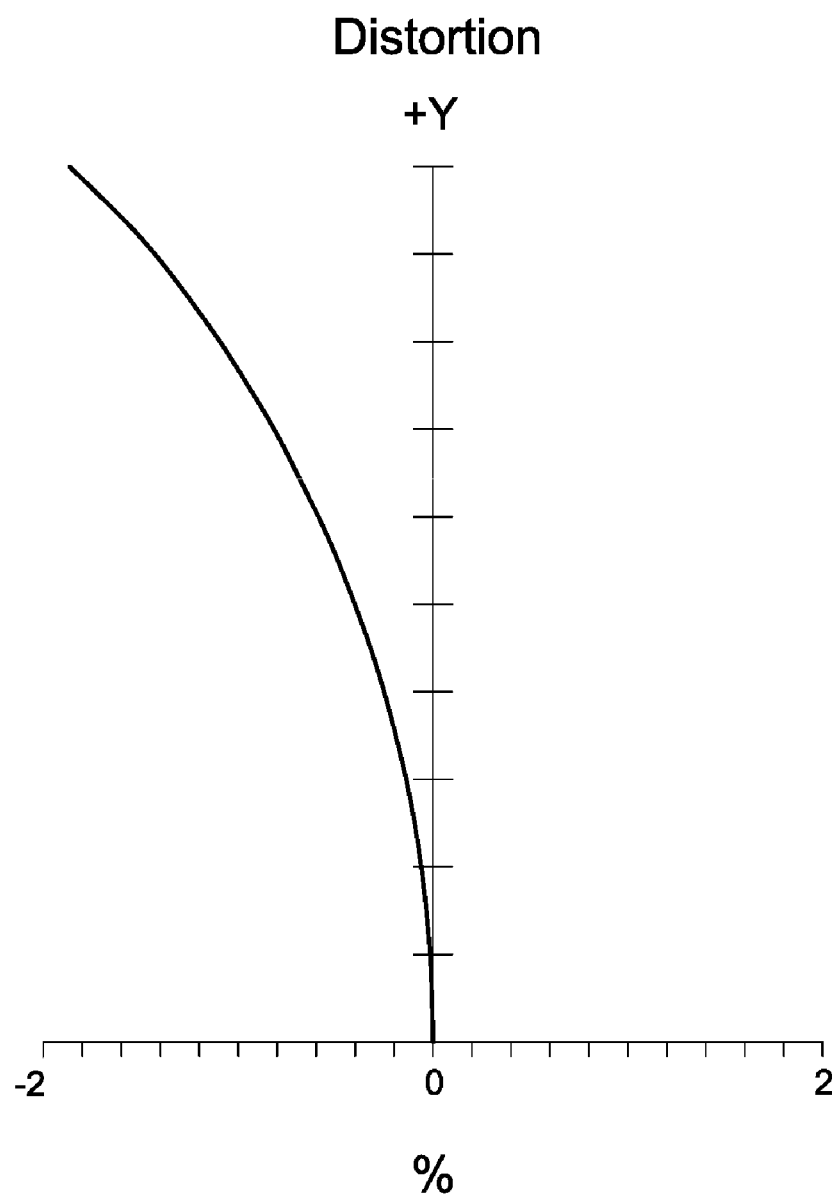
FIG. 4C is a distortion diagram of a lens assembly in accordance with the second embodiment of the invention.
Figure 4D:
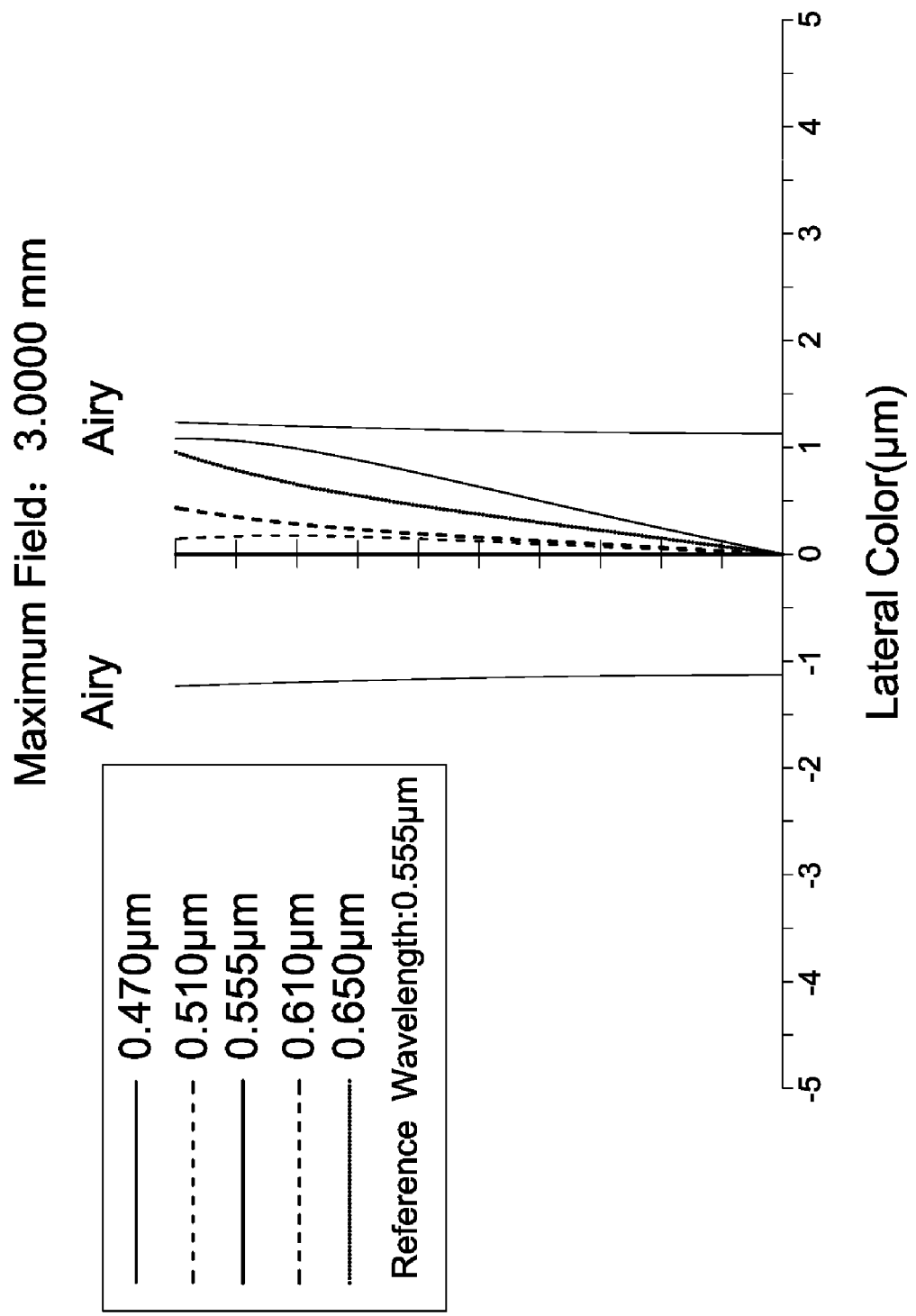
FIG. 4D is a lateral color diagram of a lens assembly in accordance with the second embodiment of the invention.
Figure 4E:
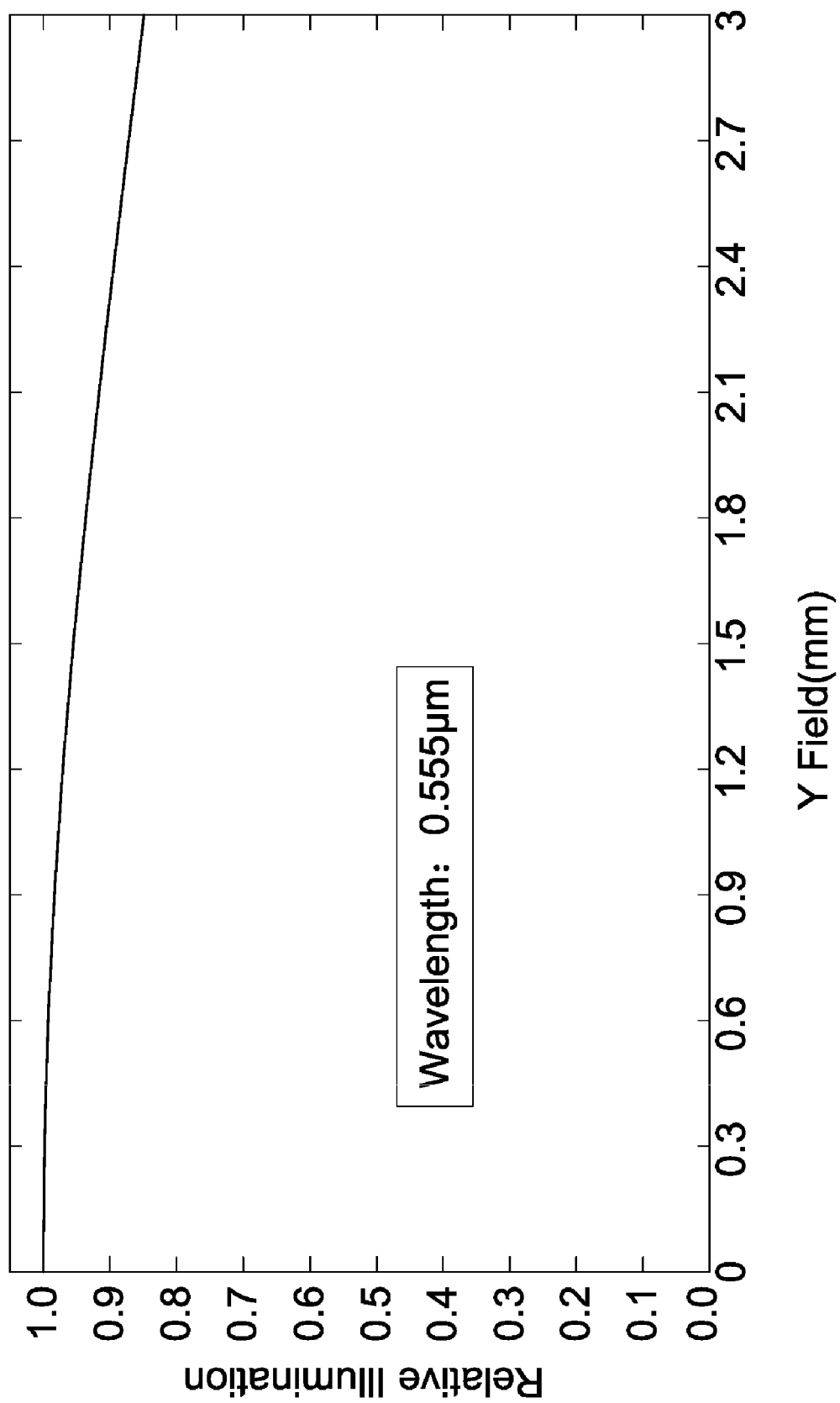
FIG. 4E is a relative illumination diagram of a lens assembly in accordance with the second embodiment of the invention.
Figure 4F:
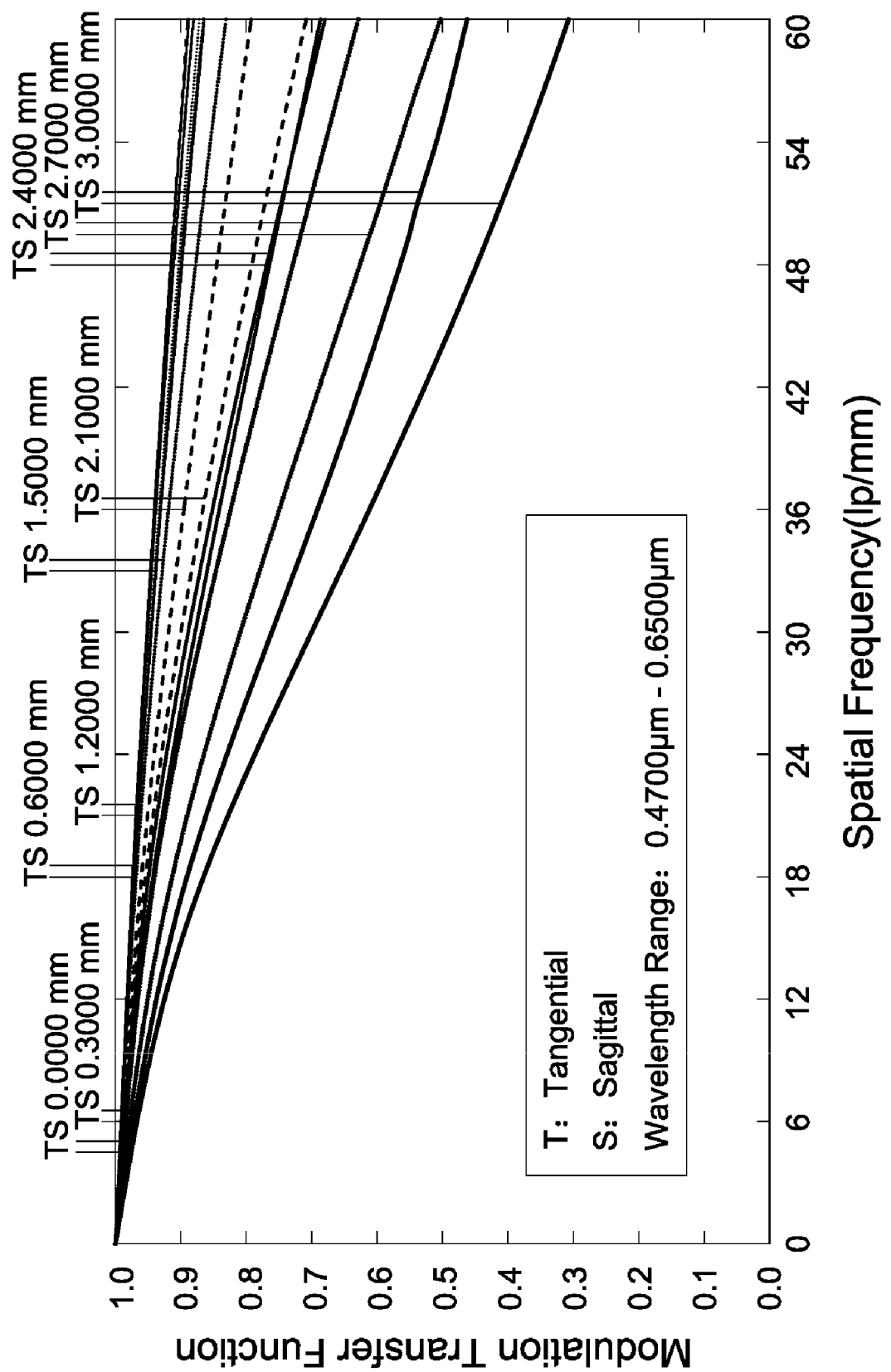
FIG. 4F is a modulation transfer function diagram of a lens assembly in accordance with the second embodiment of the invention.
Figure 4G:
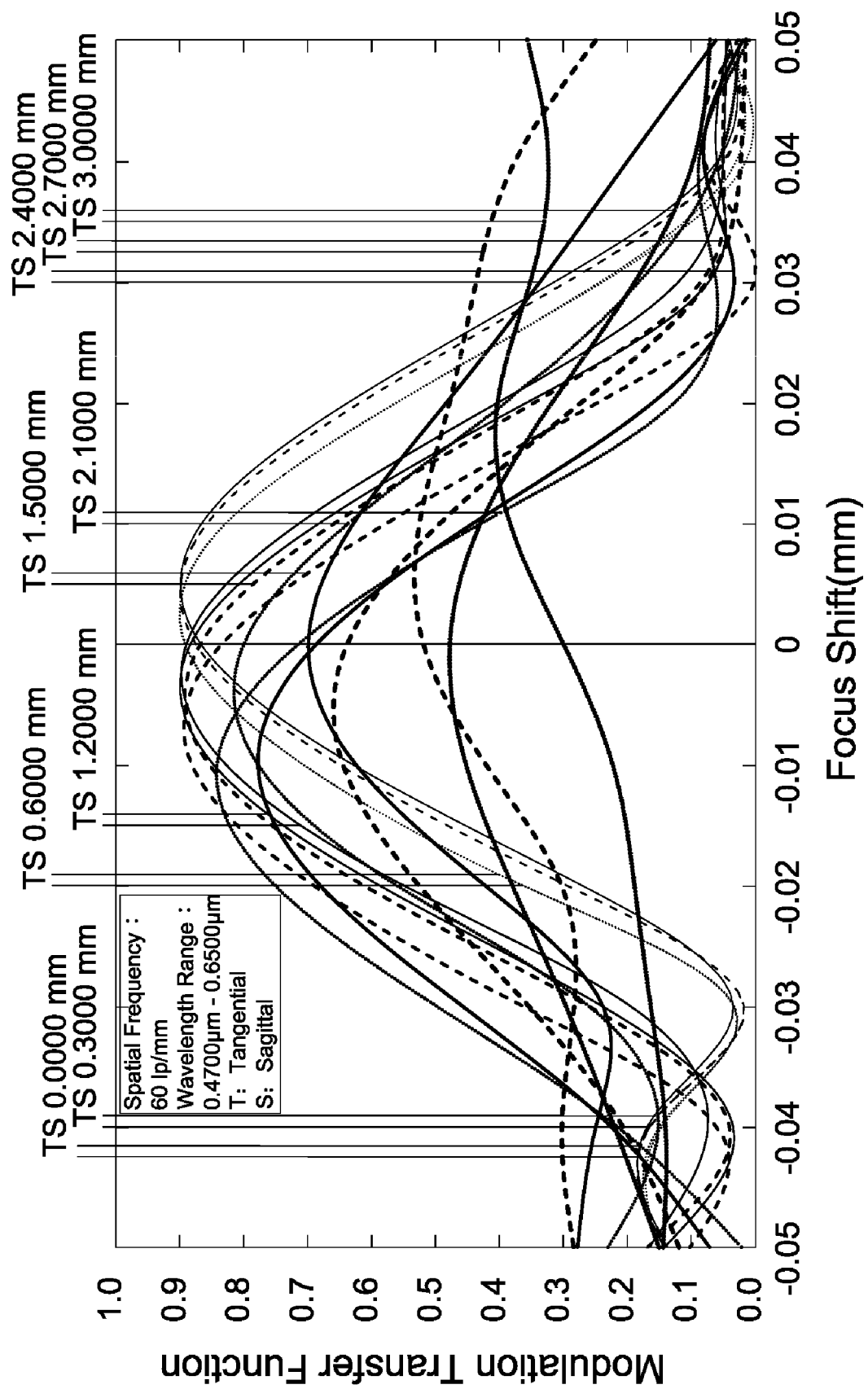
FIG. 4G is a through focus modulation transfer function diagram of a lens assembly in accordance with the second embodiment of the invention.

By the above arrangements of the lenses and stop ST2, the lens assembly 2 of the second embodiment can meet the requirements of optical performance as seen in FIGS. 4A-4G, wherein FIG. 4A shows a longitudinal aberration diagram of the lens assembly 2 in accordance with the second embodiment of the invention, FIG. 4B shows a field curvature diagram of the lens assembly 2 in accordance with the second embodiment of the invention, FIG. 4C shows a distortion diagram of the lens assembly 2 in accordance with the second embodiment of the invention, FIG. 4D shows a lateral color diagram of the lens assembly 2 in accordance with the second embodiment of the invention, FIG. 4E shows a relative illumination diagram of the lens assembly 2 in accordance with the second embodiment of the invention, FIG. 4F shows a modulation transfer function diagram of the lens assembly 2 in accordance with the second embodiment of the invention and FIG. 4G shows a through focus modulation transfer function diagram of the lens assembly 2 in accordance with the second embodiment of the invention.

It can be seen from FIG. 4A that the longitudinal aberration in the lens assembly 2 of the second embodiment ranges from 0 mm to 0.04 mm for the wavelength of 0.470 μm, 0.510 μm, 0.555 μm, 0.610 μm, and 0.650 μm. It can be seen from FIG. 4B that the field curvature of tangential direction and sagittal direction in the lens assembly 2 of the second embodiment ranges from −0.015 mm to 0.045 mm for the wavelength of 0.470 μm, 0.510 μm, 0.555 μm, 0.610 μm, and 0.650 μm. It can be seen from FIG. 4C (in which the fifth lines in the figure almost coincide to appear as if a signal line) that the distortion in the lens assembly 2 of the second embodiment ranges from −1.9% to 0% for the wavelength of 0.470 μm, 0.510 μm, 0.555 μm, 0.610 μm, and 0.650 μm. It can be seen from FIG. 4D that the lateral color in the lens assembly 2 of the second embodiment ranges from 0 μm to 1.5 μm, a maximum field height is equal to 3.0000 mm for the wavelength of 0.470 μm, 0.510 μm, 0.555 μm, 0.610 μm, and 0.650 μm. It can be seen from FIG. 4E that the relative illumination in the lens assembly 2 of the second embodiment ranges from 0.85 mm to 1 mm when the wavelength is 0.555 μm and Y-field ranges from 0 mm to 3 mm. It can be seen from FIG. 4F that the modulation transfer function of tangential direction and sagittal direction in the lens assembly 2 of the second embodiment ranges from 0.31 to 1.0 when the wavelength ranges from 0.4700 μm to 0.6500 μm, the fields respectively are 0.0000 mm, 0.3000 mm, 0.6000 mm, 1.2000 mm, 1.5000 mm, 2.1000 mm, 2.4000 mm, 2.7000 mm, 3.0000 mm, and the spatial frequency ranges from 0 lp/mm to 60 lp/mm. It can be seen from FIG. 4G that the through focus modulation transfer function of tangential direction and sagittal direction in the lens assembly 2 of the second embodiment ranges is greater than 0.2 as focus shift ranges from −0.016 mm to 0.023 mm wherein the wavelength ranges from 0.4700 μm to 0.6500 μm, the fields respectively are 0.0000 mm, 0.3000 mm, 0.6000 mm, 1.2000 mm, 1.5000 mm, 2.1000 mm, 2.4000 mm, 2.7000 mm, 3.0000 mm, and the spatial frequency is equal to 60 lp/mm. It is obvious that the longitudinal aberration, the field curvature, the distortion and the lateral color of the lens assembly 2 of the second embodiment can be corrected effectively, and the relative illumination, the resolution and the depth of focus of the lens assembly 2 of the second embodiment can meet the requirement, thereby capable of good optical performance.

Figure 5:
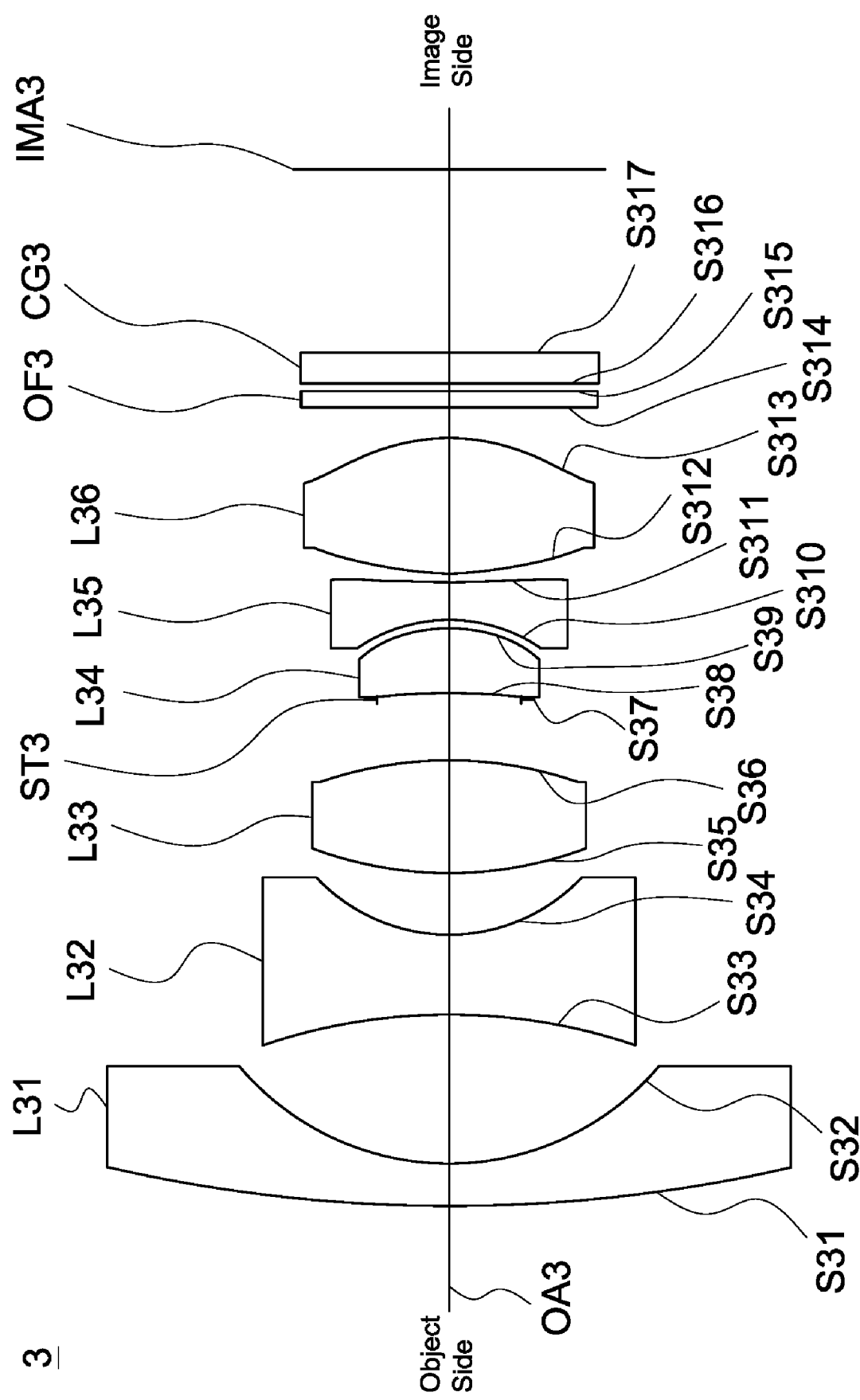
FIG. 5 is a lens layout and optical path diagram of a lens assembly in accordance with a third embodiment of the invention.

Referring to FIG. 5, FIG. 5 is a lens layout and optical path diagram of a lens assembly 3 in accordance with a third embodiment of the invention. The lens assembly 3 includes a first lens L31, a second lens L32, a stop ST3, a third lens L33, a fourth lens L34, a fifth lens L35, a sixth lens L36, an optical filter OF3 and a cover glass CG3, all of which are arranged in sequence from an object side to an image side along an optical axis OA3. In operation, an image of light rays from the object side is formed at an image plane IMA3.

The first lens L31 is a meniscus lens with negative refractive power and made of glass material, wherein the object side surface S31 is a convex surface, the image side surface S32 is a concave surface and both of the object side surface S31 and image side surface S32 are spherical surfaces. The second lens L32 is a biconcave lens with negative refractive power and made of glass material, wherein the object side surface S33 is a concave surface, the image side surface S34 is a concave surface and both of the object side surface S33 and image side surface S34 are aspheric surfaces. The third lens L33 is a biconvex lens with positive refractive power and made of glass material, wherein the object side surface S35 is a convex surface, the image side surface S36 is a convex surface and both of the object side surface S35 and image side surface S36 are spherical surfaces. The fourth lens L34 is a meniscus lens with positive refractive power and made of plastic material, wherein the object side surface S38 is a concave surface, the image side surface S39 is a convex surface and both of the object side surface S38 and image side surface S39 are aspheric surfaces. The fifth lens L35 is a biconcave lens with negative refractive power and made of plastic material, wherein the object side surface S310 is a concave surface, the image side surface S311 is a concave surface and both of the object side surface S310 and image side surface S311 are aspheric surfaces. The sixth lens L36 is a biconvex lens with positive refractive power and made of plastic material, wherein the object side surface S312 is a convex surface, the image side surface S313 is a convex surface and both of the object side surface S312 and image side surface S313 are aspheric surfaces. The fourth lens L24 and the fifth lens L25 are cemented together. Both of the object side surface S314 and image side surface S315 of the optical filter OF3 are plane surfaces. Both of the object side surface S316 and image side surface S317 of the cover glass CG3 are plane surfaces.

In order to maintain excellent optical performance of the lens assembly 3 in accordance with the third embodiment of the invention, the lens assembly 3 satisfies at least one of the following conditions:

$$2.1 < |f3_1/f3| < 4.0 \quad (11)$$

$$0.3 < f3_3/f3 < 2.5 \quad (12)$$

$$0.3 < f3_3/f3 < 3.0 \quad (13)$$

$$-1.8 < f3_5/f3 < -0.2 \quad (14)$$

$$0.1 < |BFL3/TTL3| < 0.5 \quad (15)$$

Wherein f3 is an effective focal length of the lens assembly 3, $f3_1$ is an effective focal length of the first lens L31, $f3_3$ is an effective focal length of the third lens L33, $f3_4$ is an effective focal length of the fourth lens L34, $f3_5$ is an effective focal length of the fifth lens L35, BFL3 is an interval from the image side S313 of the sixth lens L36 to the image plane IMA3 along the optical axis OA3, and TTL3 is an interval from the object surface S31 of the first lens L31 to the image plane IMA3 along the optical axis OA3.

By the above design of the lenses and stop ST3, the lens assembly 3 is provided with a shortened total lens length, a decreased F-number, an increased resolution, an effective corrected aberration and a resistance to severe environment temperature change on image quality.

If the condition (13), value of $f3_4$–f3, is less than 0.3, manufacturability of the lens assembly 3 is not good enough. Accordingly, the value of $f3_4$–f3 has to be at least greater than 0.3. A preferred range is $0.3 < f3_4/f3 < 3.0$. An value within this range can better achieve the balance between the optical performance and the manufacturability. If the value of $f3_4$–f3 increases, better manufacturability is obtained. If the value of $f3_4$–f3 decreases, better image resolving ability in peripheral regions is obtained.

In order to achieve the above purposes and effectively enhance the optical performance, the lens assembly 3 in accordance with the third embodiment of the invention is provided with the optical specifications shown in Table 7, which include the effective focal length, F-number, total lens length, radius of curvature of each lens surface in mm, thickness between adjacent surface in mm, refractive index of each lens and Abbe number of each lens. Table 7 shows that the effective focal length is equal to 1.333 mm, F-number is equal to 2.0, total lens length is equal to 13.501 mm, and angle of half field of view is equal to 180° for the lens assembly 3 of the third embodiment of the invention.

TABLE 7

Effective Focal Length = 1.333 mm
F-number = 2.0
Total Lens Length = 13.501 mm
Angle of Half Field of View = 180°

| Surface Number | Radius of Curvature (mm) | Thickness (mm) | Nd | Vd | Remark |
|---|---|---|---|---|---|
| S31 | 16.150 | 0.548 | 1.729 | 54.680 | The First Lens L31 |
| S32 | 2.994 | 1.944 | | | |
| S33 | −6.087 | 1.040 | 1.531 | 55.839 | The Second Lens L32 |
| S34 | 1.768 | 0.805 | | | |
| S35 | 4.128 | 1.467 | 1.714 | 29.666 | The Third Lens L33 |
| S36 | −4.128 | 0.789 | | | |
| S37 | ∞ | 0.088 | | | Stop ST3 |
| S38 | −18.799 | 0.843 | 1.531 | 55.839 | The fourth L34 |
| S39 | −1.790 | 0.112 | | | |
| S310 | −1.592 | 0.492 | 1.661 | 20.373 | The fifth L35 |
| S311 | 8.153 | 0.110 | | | |
| S312 | 2.182 | 1.767 | 1.531 | 55.839 | The sixth L36 |
| S313 | −2.098 | 0.400 | | | |
| S314 | ∞ | 0.210 | 1.517 | 64.17 | Optical Filter OF3 |
| S315 | ∞ | 0.100 | | | |
| S316 | ∞ | 0.400 | 1.517 | 64.17 | Cover Glass CG3 |
| S317 | ∞ | 2.388 | | | |

The aspheric surface sag z of each lens in table 7 can be calculated by the following formula:

$$z = ch^2 / \{1 + [1 - (k+1)c^2h^2]^{1/2}\} + Ah^4 + Bh^6 + Ch^8 + Dh^{10} + Eh^{12} + Fh^{14}$$

where c is curvature, h is the vertical distance from the lens surface to the optical axis, k is conic constant and A, B, C, D, E and F are aspheric coefficients.

In the first embodiment, the conic constant k and the aspheric coefficients A, B, C, D, E and F of each surface are shown in Table 8.

TABLE 8

| Surface Number | k | A | B | C | D | E | F |
|---|---|---|---|---|---|---|---|
| S33 | 0 | −0.00019139 | 2.2645E−05 | 0 | 0 | 0 | 0 |
| S34 | −0.8972752 | 0.005787148 | 0.001585869 | 0 | 0 | 0 | 0 |
| S38 | 105.4957 | −0.04490435 | −0.012592272 | 0.015978017 | −0.03844068 | 0 | 0 |
| S39 | 0.1289416 | −0.03133156 | −0.0014734 | −0.01787063 | 0.004129583 | 0 | 0 |
| S310 | −1.510921 | 0.041795136 | −0.069707006 | 0.003004172 | 0.007601312 | 0 | 0 |
| S311 | −519.4404 | −0.00340789 | 0.007928762 | −0.00180959 | −0.00186297 | 0 | 0 |
| S312 | −20.16761 | −0.00112502 | −0.01007733 | 0.025756216 | −0.01537442 | 0.004196863 | −0.00047823 |
| S313 | 0 | 0.012505667 | −0.002067933 | 0.006025604 | −0.00342719 | 0.001391414 | −0.00018973 |

Table 9 shows the parameter value and the calculated value of the above conditions (11)-(15). For the lens assembly 3 of the third embodiment which respectively satisfy the above conditions (11)-(15) as can be seen from table 9.

TABLE 9

| f3 | 1.333 mm | f3$_1$ | −5.115 mm | f3$_3$ | 3.102 mm |
|---|---|---|---|---|---|
| f3$_4$ | 3.648 mm | f3$_5$ | −1.957 mm | BFL3 | 3.498 mm |
| TTL3 | 13.501 mm | | | | |
| |f3$_1$/f3| | 3.837 | f3$_3$/f3 | 2.327 | f3$_4$/f3 | 2.737 |
| f3$_5$/f3 | −1.468 | |BFL3/TTL3| | 0.259 | | |

Figure 6B:
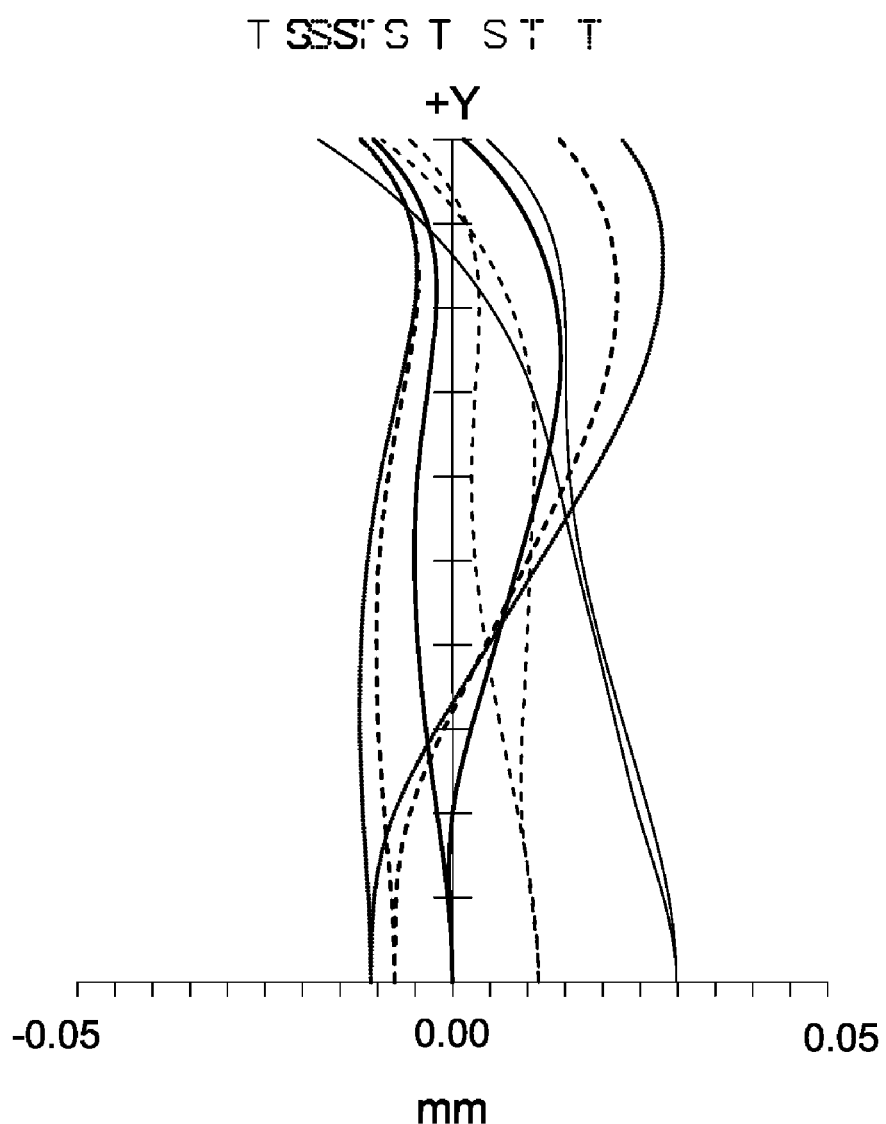
FIG. 6B is an astigmatic field curvature diagram of a lens assembly in accordance with the third embodiment of the invention.
Figure 6C:
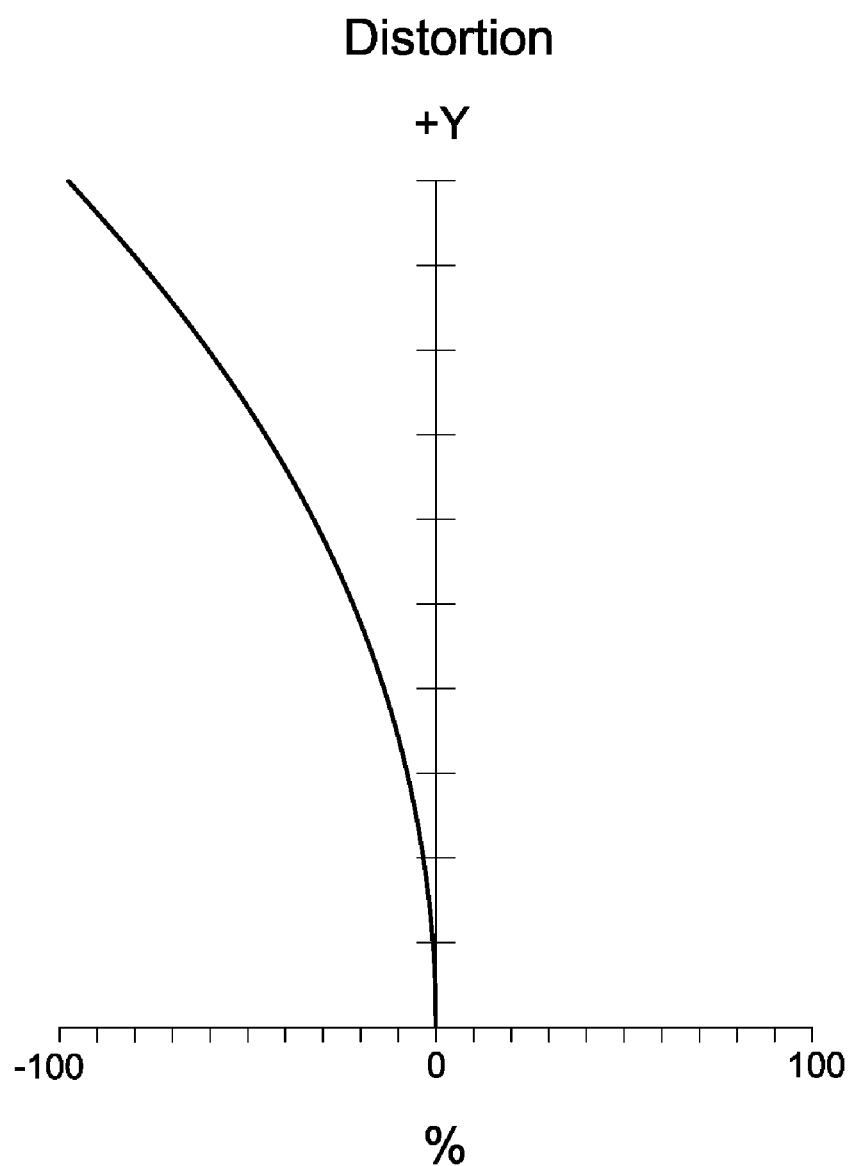
FIG. 6C is a distortion diagram of a lens assembly in accordance with the third embodiment of the invention.
Figure 6D:
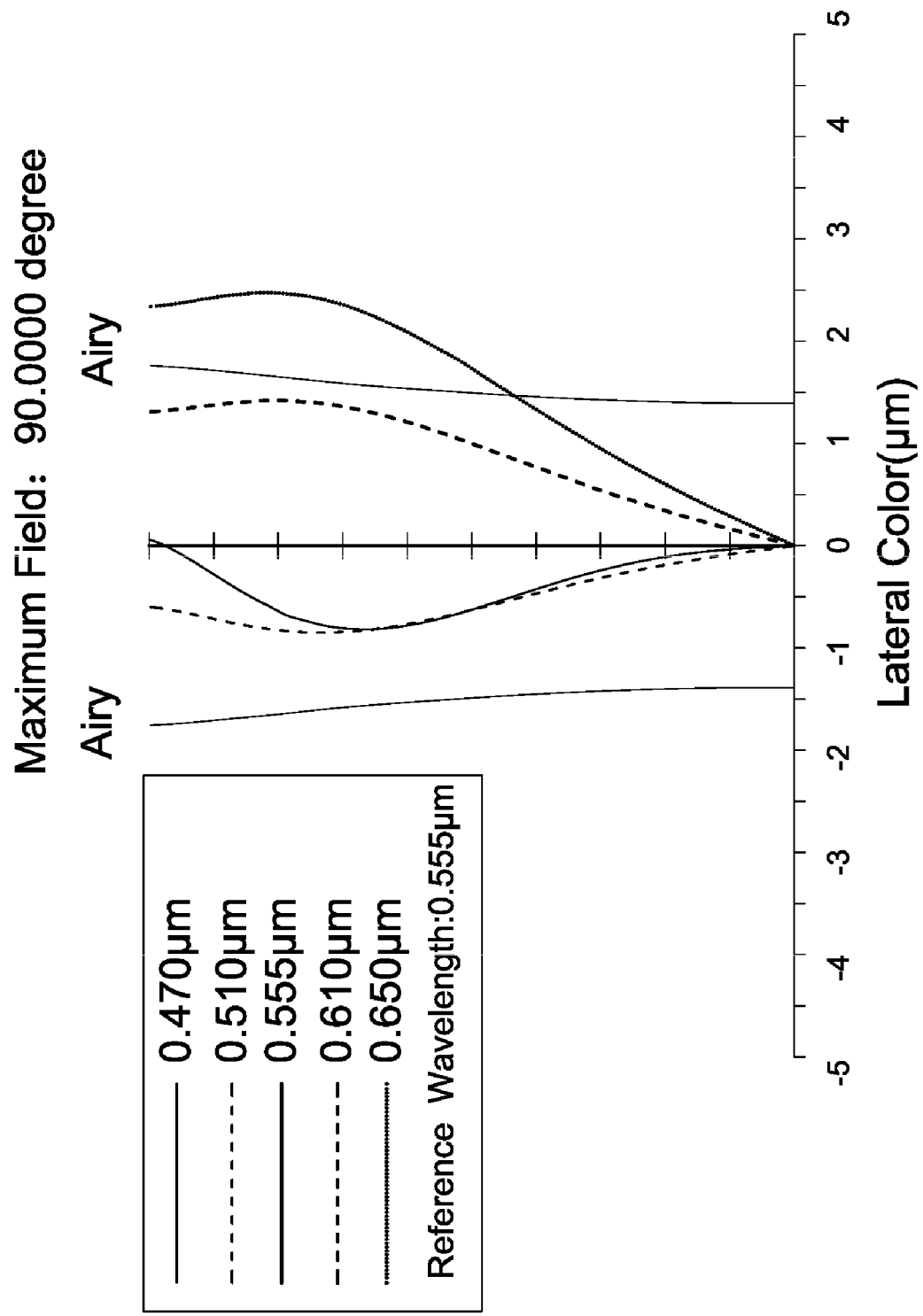
FIG. 6D is a lateral color diagram of a lens assembly in accordance with the third embodiment of the invention.
Figure 6E:
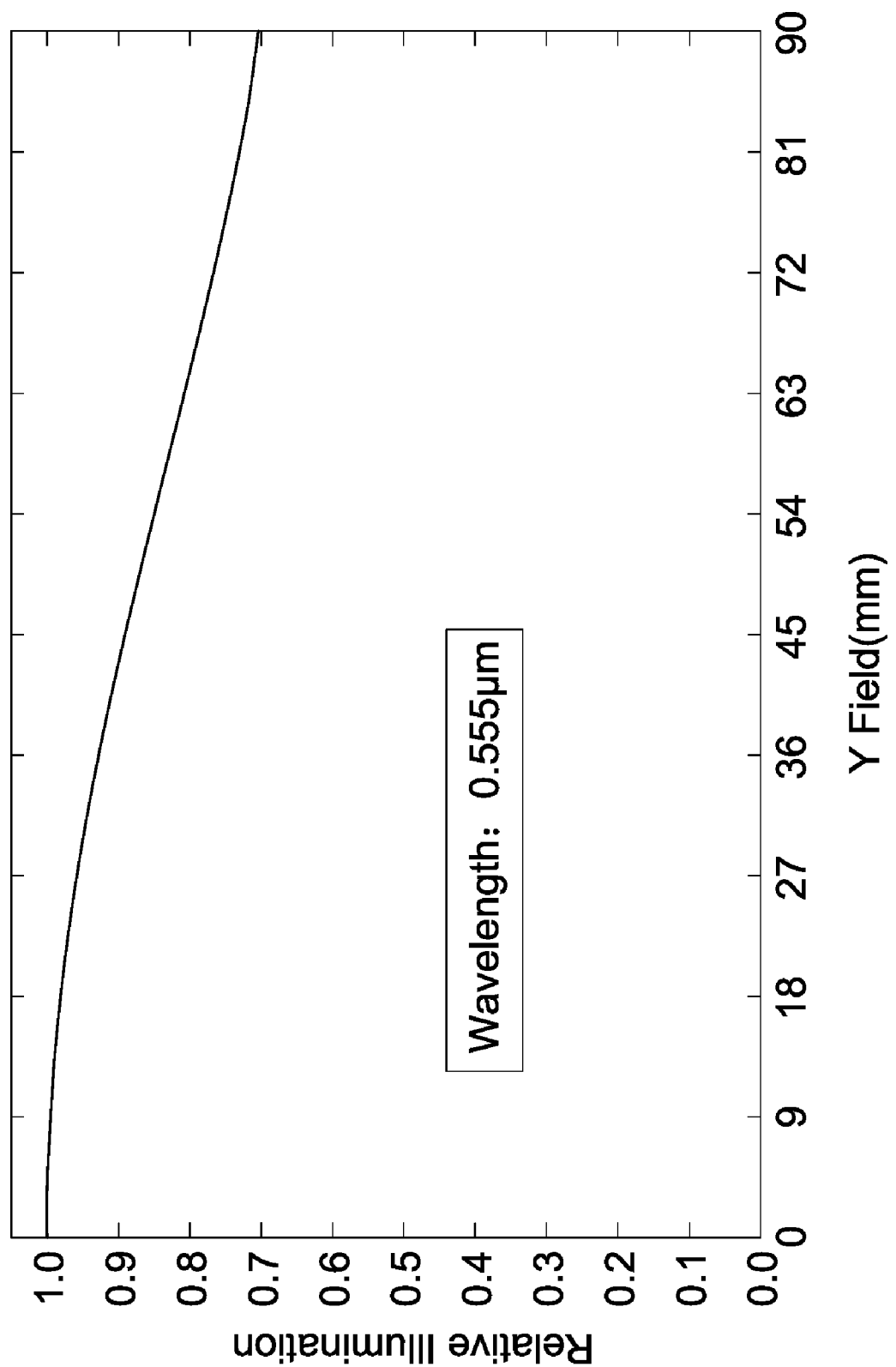
FIG. 6E is a relative illumination diagram of a lens assembly in accordance with the third embodiment of the invention.
Figure 6F:
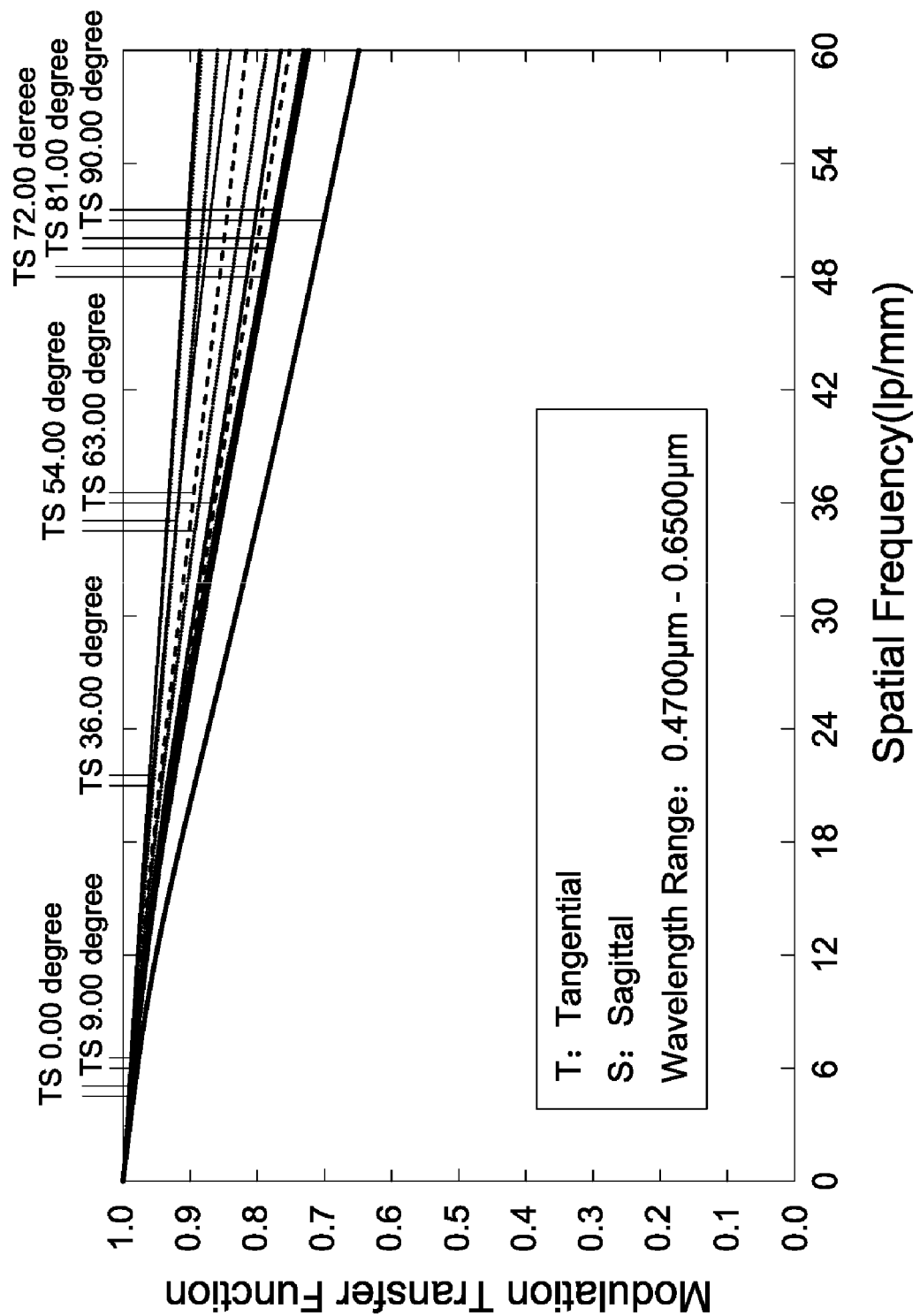
FIG. 6F is a modulation transfer function diagram of a lens assembly in accordance with the third embodiment of the invention.
Figure 6G:
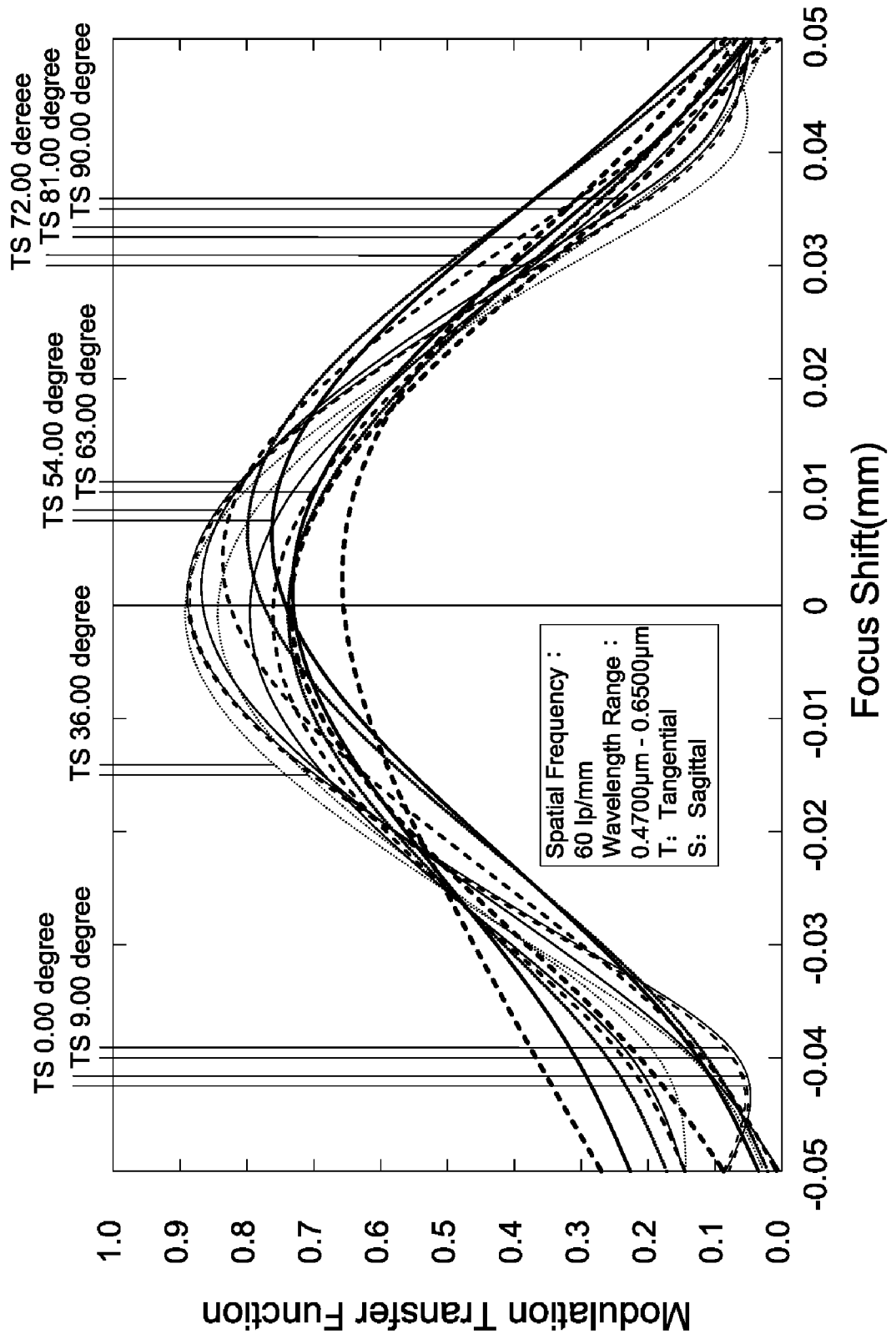
FIG. 6G is a through focus modulation transfer function diagram of a lens assembly in accordance with the third embodiment of the invention.

By the above arrangements of the lenses and stop ST3, the lens assembly 3 of the third embodiment can meet the requirements of optical performance as seen in FIGS. 6A-6G, wherein FIG. 6A shows a longitudinal aberration diagram of the lens assembly 3 in accordance with the third embodiment of the invention, FIG. 6B shows a field curvature diagram of the lens assembly 3 in accordance with the third embodiment of the invention, FIG. 6C shows a distortion diagram of the lens assembly 3 in accordance with the third embodiment of the invention, FIG. 6D shows a lateral color diagram of the lens assembly 3 in accordance with the third embodiment of the invention, FIG. 6E shows a relative illumination diagram of the lens assembly 3 in accordance with the third embodiment of the invention, FIG. 6F shows a modulation transfer function diagram of the lens assembly 3 in accordance with the third embodiment of the invention and FIG. 6G shows a through focus modulation transfer function diagram of the lens assembly 3 in accordance with the third embodiment of the invention.

It can be seen from FIG. 6A that the longitudinal aberration in the lens assembly 3 of the third embodiment ranges from −0.015 mm to 0.03 mm for the wavelength of 0.470 µm, 0.510 µm, 0.555 µm, 0.610 µm, and 0.650 µm. It can be seen from FIG. 6B that the field curvature of tangential direction and sagittal direction in the lens assembly 3 of the third embodiment ranges from −0.02 mm to 0.03 mm for the wavelength of 0.470 µm, 0.510 µm, 0.555 µm, 0.610 µm, and 0.650 µm. It can be seen from FIG. 6C (in which the fifth lines in the figure almost coincide to appear as if a signal line) that the distortion in the lens assembly 3 of the third embodiment ranges from −100% to 0% for the wavelength of 0.470 µm, 0.510 µm, 0.555 µm, 0.610 µm, and 0.650 µm. It can be seen from FIG. 6D that the lateral color in the lens assembly 3 of the third embodiment ranges from −1 µm to 2.5 µm, a maximum field angle is equal to 90.0000° for the wavelength of 0.470 µm, 0.510 µm, 0.555 µm, 0.610 µm, and 0.650 µm. It can be seen from FIG. 6E that the relative illumination in the lens assembly 3 of the third embodiment ranges from 0.71 mm to 1.0 mm when the wavelength is 0.555 µm and Y-field ranges from 0° to 90°. It can be seen from FIG. 6F that the modulation transfer function of tangential direction and sagittal direction in the lens assembly 3 of the third embodiment ranges from 0.65 to 1.0 when the wavelength ranges from 0.4700 µm to 0.6500 µm, the fields respectively are 0.00°, 9.00°, 36.00°, 54.00°, 63.00°, 72.00°, 81.00°, 90.00°, and the spatial frequency ranges from 0 lp/mm to 60 lp/mm. It can be seen from FIG. 6G that the through focus modulation transfer function of tangential direction and sagittal direction in the lens assembly 3 of the third embodiment ranges is greater than 0.2 as focus shift ranges from −0.033 mm to 0.034 mm wherein the wavelength ranges from 0.4700 µm to 0.6500 µm, the fields respectively are 0.00°, 9.00°, 36.00°, 54.00°, 63.00°, 72.00°, 81.00°, 90.00°, and the spatial frequency is equal to 60 lp/mm. It is obvious that the longitudinal aberration, the field curvature, the distortion and the lateral color of the lens assembly 3 of the third embodiment can be corrected effectively, and the relative illumination, the resolution and the depth of focus of the lens assembly 3 of the third embodiment can meet the requirement, thereby capable of good optical performance. Angle of half field of view is equal to 90°.

Formulas of the present disclosure center on $2.1<|f_1/f|<4.0$, $0.3<f_3/f<2.5$, $0.3<f_4/f<3.0$. The embodiments of the present disclosure also fall within ranges of other formulas. The formula $2.1<|f_1/f|<4.0$, $0.3<f_3/f<2.5$, $0.3<f_4/f<3.0$ is helpful in achieving the balance between the optical performance and the manufacturability.

While the preferred embodiments of the present disclosure have been illustrated and described in detail, various modifications and alterations can be made by persons skilled in this art. The embodiment of the present disclosure is therefore described in an illustrative but not restrictive sense. It is intended that the present disclosure should not be limited to the particular forms as illustrated, and that all modifications and alterations which maintain the spirit and realm of the present disclosure are within the scope as defined in the appended claims.

What is claimed is:

1. A lens assembly, in sequence from an object side to an image side along an optical axis, comprising:
   a first lens which is a meniscus lens with positive refractive power, and includes a convex surface facing the object side and a concave surface facing the image side;
   a second lens with negative refractive power, which includes a concave surface facing the object side;
   a third lens with positive refractive power, which includes a convex surface facing the image side;
   a stop;
   a fourth lens with positive refractive power, which includes a convex surface facing the image side;
   a fifth lens which is a biconcave lens with negative refractive power; and
   a sixth lens with positive refractive power, which includes a convex surface facing the object side;
   wherein the lens assembly satisfies:

$-3.44<R21/R22<-1.63$ wherein R21 is a radius of curvature of an object side surface of the second lens and R22 is a radius of curvature of an image side surface of the second lens.

2. The lens assembly as claimed in claim 1, wherein the lens assembly satisfies:

$0.3<f_4/f<3.0$ wherein $f_4$ is a focal length of the fourth lens and f is an effective focal length of the lens assembly.

3. The lens assembly as claimed in claim 2, wherein the lens assembly satisfies:

$0.3<f_3/f<2.5$ wherein $f_3$ is a focal length of the third lens and f is an effective focal length of the lens assembly.

4. The lens assembly as claimed in claim 3, wherein the lens assembly satisfies:

$2.1<|f_1/f|<4.0$ wherein $f_1$ is a focal length of the first lens and f is an effective focal length of the lens assembly.

5. The lens assembly as claimed in claim 4, wherein the lens assembly satisfies:

$1.8<f_5/f<-0.2$ wherein $f_5$ is a focal length of the fifth lens and f is an effective focal length of the lens assembly.

6. The lens assembly as claimed in claim 1, wherein the lens assembly satisfies:

$0.1<|BFL/TTL|<0.5$ wherein BFL is an interval from an image side surface of the sixth lens to an image plane along the optical axis and TTL is an interval from an object side surface of the first lens to the image plane along the optical axis.

7. The lens assembly as claimed in claim 1, wherein the lens assembly satisfies:

$21.67<Vd4/Nd4<36.47$ wherein $Vd_4$ is an Abbe number of the fourth lens and $Nd_4$ is a refractive index of the fourth lens.

8. The lens assembly as claimed in claim 1, wherein the lens assembly satisfies:

$-7.58<f1+f2<23.66$ wherein $f_1$ is a focal length of the first lens and $f_2$ is a focal length of the second lens.

9. The lens assembly as claimed in claim 1, wherein the fourth lens further comprises another convex surface facing the object side.

10. The lens assembly as claimed in claim 1, wherein an image side surface of the second lens is concave.

11. The lens assembly as claimed in claim 1, wherein an object side surface of the third lens is convex.

12. The lens assembly as claimed in claim 1, wherein an image side surface of the sixth lens is convex.

13. The lens assembly as claimed in claim 1, wherein the fourth lens and the fifth lens are cemented together.

14. The lens assembly as claimed in claim 1, wherein the first lens, the second lens, the third lens, the fourth lens and the fifth lens are spherical glass lenses.

15. The lens assembly as claimed in claim 1, wherein the sixth lens is an aspherical glass lens.

16. A lens assembly, in sequence from an object side to an image side along an optical axis, comprising:
   a first lens which is a meniscus lens with negative refractive power, and includes a convex surface facing the object side and a concave surface facing the image side;
   a second lens with negative refractive power, which includes a concave surface facing the object side;
   a third lens with positive refractive power, which includes a convex surface facing the image side;
   a fourth lens with positive refractive power, which includes a concave surface facing the object side;
   a fifth lens which is a biconcave lens with negative refractive power; and
   a sixth lens with positive refractive power, which includes a convex surface facing the object side;
   wherein the lens assembly satisfies the following conditions:

$7.58<f1+f2<0$, $2.1<|f_1/f|<4.0$ wherein f is an effective focal length of the lens assembly, $f_1$ is a focal length of the first lens, and $f_2$ is a focal length of the second lens.

17. The lens assembly as claimed in claim 16, wherein the lens assembly satisfies:

$-3.44<R21/R22<-1.63$ wherein R21 is a radius of curvature of an object side surface of the second lens and R22 is a radius of curvature of an image side surface of the second lens.

18. The lens assembly as claimed in claim 16, wherein the second lens further comprises another concave surface facing the image side.

19. The lens assembly as claimed in claim 16, wherein the third lens further comprises another convex surface facing the object side.

* * * * *